US012732811B2

(12) United States Patent
Lu

(10) Patent No.: US 12,732,811 B2
(45) Date of Patent: Sep. 8, 2026

(54) LOGIN AUTHENTICATION SYSTEM AND METHOD, AND ELECTRONIC DEVICE

(71) Applicant: Huawei Technologies Co., Ltd., Shenzhen (CN)

(72) Inventor: Yonghua Lu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/847,472

(22) PCT Filed: Oct. 30, 2023

(86) PCT No.: PCT/CN2023/127664
§ 371 (c)(1),
(2) Date: Sep. 16, 2024

(87) PCT Pub. No.: WO2024/139633
PCT Pub. Date: Jul. 4, 2024

(65) Prior Publication Data

US 2025/0008326 A1 Jan. 2, 2025

(30) Foreign Application Priority Data

Dec. 30, 2022 (CN) ........................ 202211734548.X

(51) Int. Cl.
*H04W 12/06* (2021.01)
*H04W 12/72* (2021.01)

(52) U.S. Cl.
CPC ........... *H04W 12/06* (2013.01); *H04W 12/72* (2021.01)

(58) Field of Classification Search
None
See application file for complete search history.

(56) References Cited

U.S. PATENT DOCUMENTS

2006/0293028 A1* 12/2006 Gadamsetty ............ H04L 63/08 455/411
2007/0004457 A1* 1/2007 Han ........................ H04W 8/20 455/558
2011/0028126 A1* 2/2011 Lim ...................... H04W 12/06 455/411
2011/0247055 A1* 10/2011 Guo ...................... H04L 9/3263 726/4
2013/0331028 A1* 12/2013 Kuehnel ............... H04W 76/10 455/41.1
2014/0189808 A1 7/2014 Mahaffey et al.
(Continued)

FOREIGN PATENT DOCUMENTS

CN 115130085 A 9/2022
EP 2611097 A1 * 7/2013 ......... H04L 63/0838
EP 3579167 A1 12/2019

*Primary Examiner* — Christopher C Harris
(74) *Attorney, Agent, or Firm* — Slater Matsil, LLP

(57) ABSTRACT

The system includes a first server and a first device. The first server is configured to send device information of a first device set to the first device. The first device set includes at least one device. Each device in the first device set is associated with the first device. The first device set includes a second device, and the second device is configured with a first subscriber identity module SIM card. The first device is configured to perform login authentication for an application based on card information of the first SIM card.

20 Claims, 12 Drawing Sheets

(56) References Cited

U.S. PATENT DOCUMENTS

| | | | | |
|---|---|---|---|---|
| 2015/0229639 | A1* | 8/2015 | Abdulrahiman | H04L 63/0853 455/411 |
| 2020/0137566 | A1* | 4/2020 | Jin | H04W 12/43 |
| 2021/0029127 | A1* | 1/2021 | Stubblefield | H04W 8/18 |
| 2022/0255945 | A1 | 8/2022 | Guan et al. | |
| 2023/0037475 | A1* | 2/2023 | Liu | H04W 12/06 |
| 2023/0254696 | A1* | 8/2023 | Ben-David | H04L 9/3239 455/41.1 |

* cited by examiner

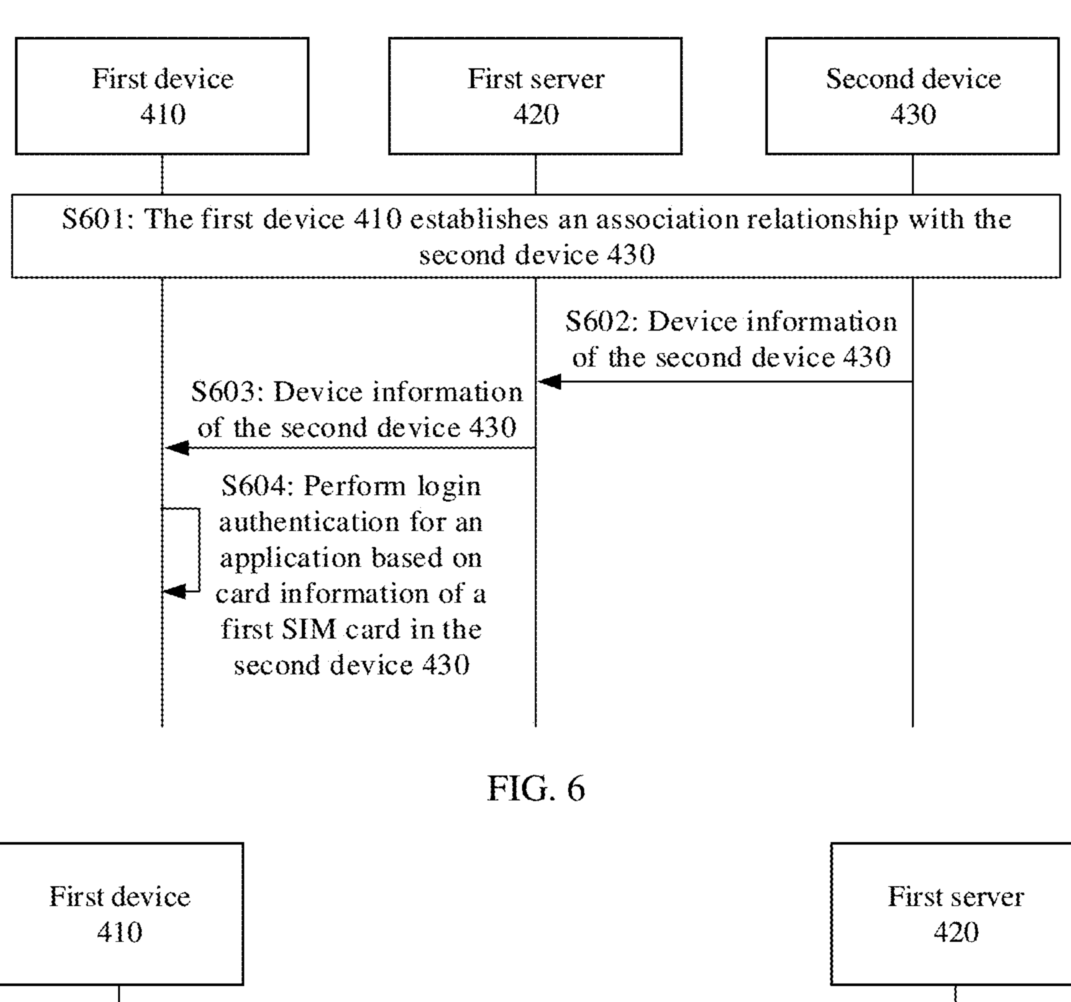

FIG. 6

First device 410

First server 420

S701: First obtaining request

S702: Device information of a first device set, where each device in the first device set is associated with the first device, the first device set includes a second device, and the second device is configured with a first SIM card S703: Perform login authentication for an application on the first device 410 based on card information of the first SIM card

FIG. 7

LOGIN AUTHENTICATION SYSTEM AND METHOD, AND ELECTRONIC DEVICE

CROSS-REFERENCE TO RELATED APPLICATIONS

This application is a national stage of International Application No. PCT/CN2023/127664, filed on Oct. 30, 2023, which claims priority to Chinese Patent Application No. 202211734548.X filed on Dec. 30, 2022. Both of the aforementioned applications are hereby incorporated by reference in their entireties.

TECHNICAL FIELD

This application relates to the field of terminal technologies, and in particular, to a login authentication system and method, and an electronic device.

BACKGROUND

With continuous development of terminal technologies, various applications such as a social application, a multimedia application, and a shopping application may be installed in an electronic device. When these applications are started, the electronic device may perform login authentication for the applications based on card information of a subscriber identity module (subscriber identity module, SIM) card, to ensure that a currently logged-in user identity is secure and reliable.

In a conventional technology, the electronic device is configured with a SIM card. The electronic device can locally obtain card information of the SIM card, and perform login authentication based on the card information, to implement one-click login with an owner number. However, if the electronic device is configured with no SIM card, that is, the electronic device is a cardless device, log-in for the applications fails.

SUMMARY

In view of this, this application provides a login authentication system and method, and an electronic device, to implement login authentication for an application on a cardless device, and improve convenience and reliability of login authentication.

To achieve the foregoing objective, according to a first aspect, an embodiment of this application provides a login authentication system, where the system includes a first server and a first device;

the first server is configured to send device information of a first device set to the first device, where the first device set includes at least one device, each device in the first device set is associated with the first device, the first device set includes a second device, and the second device is configured with a first subscriber identity module SIM card; and the first device is configured to perform login authentication for an application based on card information of the first SIM card.

In this embodiment of this application, the first device may obtain the device information of the first device set from the first server. The first device may determine, based on the device information of the first device set, the at least one device associated with the first device, where the at least one device includes the second device. In this case, the first device may perform login authentication for the application based on the card information of the first SIM card in the second device. This improves convenience and reliability of login authentication.

When more devices establish an association relationship with the first device and the devices associated with the first device are configured with more SIM cards, the first device can obtain more card information of the SIM cards, and effect of improving the convenience and the reliability of login authentication is better.

In some implementations, an association relationship between the first device and the second device may include that the first device and the second device are logged in to a same account, for example, a first account. Because the first device and the second device are associated based on a same account, a type of the association relationship may be same-account association.

In some implementations, an association relationship between the first device and the second device may include that a logged-in account of the first device is different from a logged-in account of the second device, but the logged-in account of the first device is associated with the logged-in account of the second device, that is, the second device is associated with the logged-in account of the first device. In some implementations, the first device is logged in to the first account, the second device is logged in to a second account, and the first account is associated with the second account. In some implementations, that the first account is associated with the second account may include that the first account is directly associated with the second account. In some implementations, that the first account is associated with the second account may include that the first account is indirectly associated with the second account based on at least one another account. For example, the first account is associated with a third account, and the second account is also associated with the third account. In this case, the first account is also associated with the second account. Because the first device and the second device are associated based on a plurality of accounts, a type of the association relationship may be multi-account association.

In some implementations, the device information of the first device set includes identity information of each device in the first device set, to describe, to the first device, an identity of each device associated with the first device.

In some implementations, the device information of the first device set may include card information of SIM cards configured for at least some devices in the first device set, so that the card information of at least one SIM card is directly indicated to the first device. In some implementations, the device information of the first device set may include the card information of the first SIM card.

It may be understood that the device information of the first device set may alternatively include more or less information related to at least one device in the first device set.

In some implementations, the first device is further configured to send a first obtaining request to the first server; and the first server is further configured to send the device information of the first device set to the first device in response to the first obtaining request.

In some implementations, the first obtaining request may carry at least one of identity information of the first device 410 and the first account to which the first device 410 is logged in.

In some implementations, the first obtaining request may carry at least one screening parameter, to request to obtain device information of a device that is associated with the first device and that matches the screening parameter. In some implementations, the first obtaining request may carry an association relationship type. In some implementations, the association relationship type includes at least one of same-account association and multi-account association. In some implementations, the first obtaining request may carry a network operator.

In some implementations, the device information of the first device set includes configuration information of each device in the first device set, and the configuration information of each device indicates whether the device is configured with a SIM card.

The device information of the first device set includes configuration information of each device in the first device set, that is, the first server may indicate, to the first device, whether each device associated with the first device is configured with a SIM card. This helps the first device select the second device from the devices configured with the SIM cards more quickly and more accurately, and further improves efficiency of login authentication.

In some implementations, each device in the first device set is configured with a SIM card.

In some implementations, the first server may obtain, based on configuration information of a plurality of other devices associated with the first device, devices configured with SIM cards from the plurality of other devices as the first device set. That is, the first server may accurately indicate, to the first device, devices that are associated with the first device and that are configured with SIM cards. This further helps the first device determine the second device from the devices that are associated with the first device and that are configured with the SIM cards, and further improves the efficiency of login authentication.

In some implementations, the first device set includes at least one of a second device set and a third device set;

- the second device set includes at least one device, and each device in the second device set is logged in to a same account as the first device; and
- the third device set includes at least one device, and each device in the third device set is associated with a logged-in account of the first device.

In some implementations, the system further includes the second device and a second server, and there is a far-field network connection between the first device and the second device;

- the first device is further configured to send a first authentication request to the second device through the far-field network connection, where the first authentication request is generated by the first device based on the card information of the first SIM card, and the first authentication request is used to perform login authentication for the application; the second device is configured to: connect to a cellular mobile network by using the first SIM card, and send the first authentication request to the second server through the cellular mobile network;
- the second server is configured to send a first authentication result to the second device through the cellular mobile network in response to the first authentication request; and
- the second device is further configured to send the first authentication result to the first device through the far-field network connection.

In some implementations, the first device is further configured to: establish the far-field network connection with the second device when login authentication is performed for the application; and break the far-field network connection when login authentication ends.

The first device establishes the far-field network connection when using the far-field network connection, and disables the far-field network connection when using is completed, so that power consumption of the first device and the second device can be reduced.

In some implementations, the first device is further configured to establish the far-field network connection with the second device if there is no near-field network connection between the first device and another device when login authentication is performed for the application.

When performing login authentication for the application, the first device may determine whether a near-field network connection between the first device and the another device exists. If the near-field network connection does not exist, the first device may establish the far-field network connection between the first device and the second device, to access a cellular mobile network by using the first SIM card of the second device, and communicate with the second server through the cellular mobile network, to complete the login authentication. However, if the near-field network connection exists, the first device may access a cellular mobile network by using a second SIM card of a third device, and communicate with the second server through the cellular mobile network, to complete the login authentication without establishing the far-field network connection. This improves the efficiency of login authentication.

In some implementations, the first device is further configured to: when login authentication is performed for the application, if there is no near-field network connection between the first device and the another device, establish the near-field network connection with a third device; establish the far-field network connection between the first device and the second device; and when a moment at which the far-field network connection is successfully established is earlier than a moment at which the near-field network connection is successfully established, send the first authentication request to the second device through the far-field network connection.

When performing login authentication for the application, the first device may alternatively establish both the near-field network connection between the first device and the third device 450 and the far-field network connection between the first device and the second device. When the moment at which the far-field network connection is successfully established is earlier than the moment at which the near-field network connection is successfully established, the first device accesses the cellular mobile network by using the first SIM card of the second device, and sends the first authentication request to the second server through the cellular mobile network, to perform login authentication for the application based on the card information of the first SIM card; or when the moment at which the near-field network connection is successfully established is earlier than the moment at which the far-field network connection is successfully established, the first device accesses the cellular mobile network by using the second SIM card of the third device, and sends a second authentication request to the second server through the cellular mobile network, to perform login authentication for the application based on card information of the second SIM card. This further improves the efficiency of login authentication.

In some implementations, the first device is further configured to notify, through the far-field network connection, the second device to enable the cellular mobile network, and notify, through the far-field network connection, the second device to disable the cellular mobile network.

The first device notifies, when the cellular mobile network of the second device is used, the second device to enable the cellular mobile network, and notifies, when using is disabled, the second device to disable the cellular mobile network. This can ensure the reliability of login authentication and reduce the power consumption of the second device.

In some implementations, the first server is further configured to obtain device information of the second device from the second device.

In some implementations, the card information of the first SIM card in the first device is from the second device or the first server.

In some implementations, the device information that is of the first device set and that is obtained by the first device from the first server includes the card information of the first SIM card. In some implementations, the first device may obtain the card information of the first SIM card from the first server in another manner. In some implementations, the first device may obtain the card information of the first SIM card from the second device.

According to a second aspect, an embodiment of this application provides a login authentication method. The method includes:

A first device obtains device information of a first device set from a first server, where the first device set includes at least one device, each device in the first device set is associated with the first device, the first device set includes a second device, and the second device is configured with a first subscriber identity module SIM card; and the first device performs login authentication for an application based on card information of the first SIM card.

In some implementations, that a first device obtains device information of a first device set from a first server includes:

The first device sends a first obtaining request to the first server; and the first device receives the first device set returned by the first server in response to the first obtaining request.

In some implementations, the device information of the first device set includes configuration information of each device in the first device set, and the configuration information of each device indicates whether the device is configured with a SIM card.

In some implementations, each device in the first device set is configured with a SIM card.

In some implementations, the method further includes:

The first device displays a first card set, where the first card set includes at least one SIM card, and any SIM card in the first card set is configured in any device in the first device set; and the first device determines the first SIM card from the first card set.

In some implementations, the first device set includes at least one of a second device set and a third device set;

the second device set includes at least one device, and each device in the second device set is logged in to a same account as the first device; and the third device set includes at least one device, and each device in the third device set is associated with a logged-in account of the first device.

In some implementations, the first device set includes the second device set and the third device set, and the method further includes:

The first device displays a second card set, where the second card set includes at least one SIM card, and each SIM card in the second card set is configured in any device in the second device set;

if the first device determines that the second card set does not include the first SIM card, the first device displays a third card set, where the third card set includes at least one SIM card, and any SIM card in the third card set is configured in any device in the third device set; and the first device determines the first SIM card from the third card set.

In some implementations, there is a far-field network connection between the first device and the second device, and that the first device performs login authentication for an application based on card information of the first SIM card includes:

The first device sends a first authentication request to the second device through the far-field network connection, where the first authentication request is generated by the first device based on the card information of the first SIM card, and the first authentication request is used to perform login authentication for the application; and the first device receives, through the far-field network connection, a first authentication result returned by the second device.

In some implementations, the method further includes:

When the first device performs login authentication for the application, the first device establishes the far-field network connection with the second device; and the first device breaks the far-field network connection when login authentication ends.

In some implementations, the method further includes:

When the first device performs login authentication for the application, if there is no near-field network connection between the first device and another device, the first device establishes the far-field network connection with the second device.

In some implementations, the method further includes:

When the first device performs login authentication for the application, if there is no near-field network connection between the first device and the another device, the first device establishes the near-field network connection with a third device, and establishes the far-field network connection between the first device and the second device; and that the first device sends a first authentication request to the second device through the far-field network connection includes:

When a moment at which the far-field network connection is successfully established is earlier than a moment at which the near-field network connection is successfully established, the first device sends the first authentication request to the second device through the far-field network connection.

In some implementations, the method further includes:

The first device notifies, through the far-field network connection, the second device to enable a cellular mobile network; or the first device notifies, through the far-field network connection, the second device to disable a cellular mobile network.

In some implementations, the card information of the first SIM card in the first device is from the second device or the first server.

According to a third aspect, an embodiment of this application provides a login authentication method. The method includes:

A first server sends device information of a first device set to a first device, where the first device set includes at least one device, each device in the first device set is associated with the first device, the first device set includes a second device, the second device is configured with a first subscriber identity module SIM card, and the first SIM card is used by the first device to perform login authentication for an application.

In some implementations, that a first server sends device information of a first device set to a first device includes:

The first server sends the device information of the first device set to the first device in response to a first obtaining request of the first device.

In some implementations, the device information of the first device set includes card information of the first SIM card.

In some implementations, the method further includes:

The first server obtains device information of the second device from the second device.

In some implementations, the device information of the first device set includes configuration information of each device in the first device set, and the configuration information of each device indicates whether the device is configured with a SIM card.

According to a fourth aspect, an embodiment of this application provides a login authentication apparatus. The apparatus has a function of implementing behavior of the electronic device in the foregoing aspects and the possible implementations of the foregoing aspects. The function may be implemented by hardware, or may be implemented by hardware executing corresponding software. The hardware or software includes one or more modules or units corresponding to the foregoing function, for example, a transceiver module or unit, a processing module or unit, and an obtaining module or unit.

According to a fifth aspect, an embodiment of this application provides an electronic device, including a memory and a processor, where the memory is configured to store a computer program; and the processor is configured to perform, when invoking the computer program, the method according to any one of the second aspect or the method according to any one of the third aspect.

According to a sixth aspect, an embodiment of this application provides a chip system. The chip system includes a processor. The processor is coupled to a memory, and executes a computer program stored in the memory, to implement the method according to any one of the second aspect or perform the method according to any one of the third aspect.

The chip system may be a single chip or a chip module including a plurality of chips.

According to a seventh aspect, an embodiment of this application provides a computer-readable storage medium. The computer-readable storage medium stores a computer program, and when the computer program is executed by a processor, the method according to any one of the second aspect is implemented, or the method according to any one of the third aspect is performed.

According to an eighth aspect, an embodiment of this application provides a computer program product. When the computer program product is run on an electronic device, the electronic device is enabled to perform the method according to any one of the second aspect or the method according to any one of the third aspect.

It may be understood that, for beneficial effects of the second aspect to the eighth aspect, refer to related descriptions in the first aspect. Details are not described herein again.

BRIEF DESCRIPTION OF THE DRAWINGS

FIG. 6 is a flowchart of another login authentication method according to an embodiment of this application;

FIG. 7 is a flowchart of another login authentication method according to an embodiment of this application;

DETAILED DESCRIPTION OF ILLUSTRATIVE EMBODIMENTS

A login authentication method in embodiments of this application may be applied to an electronic device like a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, a personal digital assistant (personal digital assistant, PDA), or a server. A specific type of the electronic device is not limited in embodiments of this application.

Figure 1:
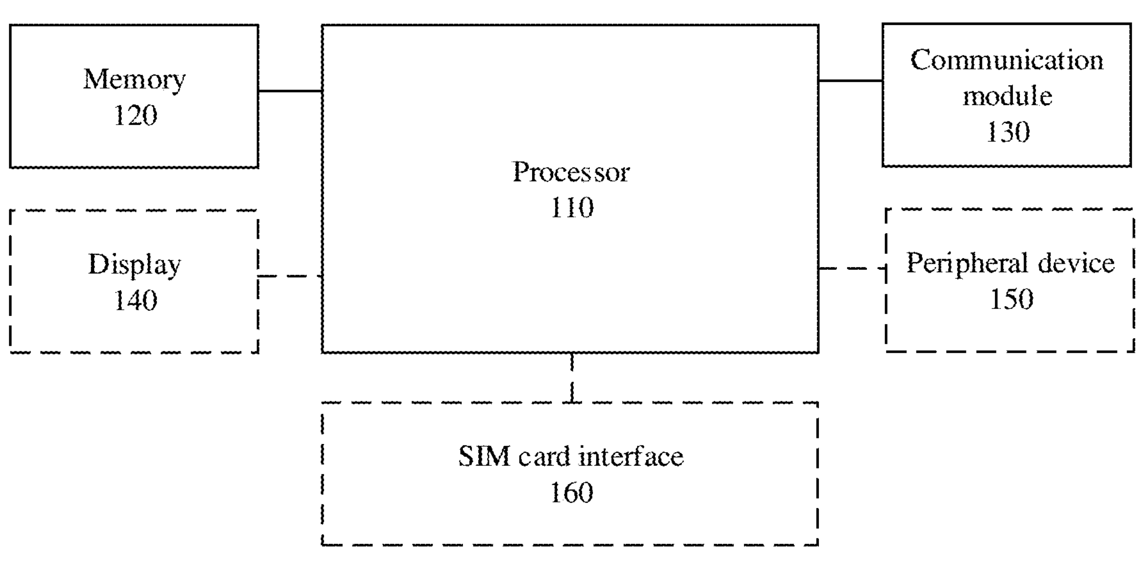
FIG. 1 is a schematic diagram of a structure of an electronic device according to an embodiment of this application.

FIG. 1 is a schematic diagram of a structure of an electronic device 100 according to an embodiment of this application. The electronic device 100 may include a processor 110, a memory 120, a communication module 130, and the like.

The processor 110 may include one or more processing units. The memory 120 is configured to store program code and data. In this embodiment of this application, the processor 110 may execute computer-executable instructions stored in the memory 120, to control and manage an action of the electronic device 100.

The communication module 130 is configured to implement communication between internal modules of the electronic device 100, or communication between the electronic device 100 and an external electronic device. For example, if the electronic device 100 communicates with another electronic device in a wired connection manner, the communication module 130 may include an interface, for example, a USB interface. The USB interface may be an interface that conforms to the USB standard specification, and may be specifically a mini USB interface, a micro USB interface, a USB Type-C interface, or the like. The USB interface is configured to connect to a charger to charge the electronic device 100, or is configured to transmit data between the electronic device 100 and a peripheral device, or is configured to connect to a headset to play audio through the headset. The interface may be alternatively configured to connect to another electronic device, for example, an AR device. For example, the communication module 130 may provide a solution to wireless communication including 2G/3G/4G/5G, or the like. For example, the communication module 130 may provide a solution to wireless communication including a wireless local area network (wireless local area network, WLAN) (like a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, the Ethernet (Ethernet), or the like.

Optionally, the electronic device 100 may further include a display 140. The display 140 is configured to display an image, a video, and the like. The display 140 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flex light-emitting diode (flex light-emitting diode, FLED), a mini-LED, a micro-LED, a micro-OLED, a quantum dot light emitting diode (quantum dot light emitting diode, QLED), or the like. In some embodiments, the electronic device 100 may include one or N displays 140, where N is a positive integer greater than 1.

Optionally, the electronic device 100 may further include a peripheral device 150, for example, a mouse, a keyboard, a speaker, or a microphone.

Optionally, the electronic device 100 may further include a SIM card interface 160. The SIM card interface 160 is configured to connect to a SIM card. The SIM card may be inserted into the SIM card interface 160 or removed from the SIM card interface 160, to implement contact with or separation from the electronic device 100. The electronic device 100 may support one or N SIM card interfaces, where N is a positive integer greater than 1. The SIM card interface 160 may support a nano-SIM card, a micro-SIM card, a SIM card, and the like. A plurality of cards may be simultaneously inserted into a same SIM card interface 160. The plurality of cards may be of a same type or different types. The SIM card interface 160 may be compatible with different types of SIM cards. The SIM card interface 160 may also be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100. In some embodiments, if the electronic device 100 does not include a SIM card, the electronic device 100 may be referred to as a cardless device. On the contrary, if the electronic device includes a SIM card, the electronic device 100 may be referred to as a card-equipped device.

It should be understood that, in addition to the various components or modules shown in FIG. 1, a structure of the electronic device 100 is not specifically limited in this embodiment of this application. In other embodiments of this application, the electronic device 100 may alternatively include more or fewer components than those shown in the figure, or combine some components, or split some components, or have a different component arrangement. The components shown in the figure may be implemented by hardware, software, or a combination of software and hardware.

Figure 2:
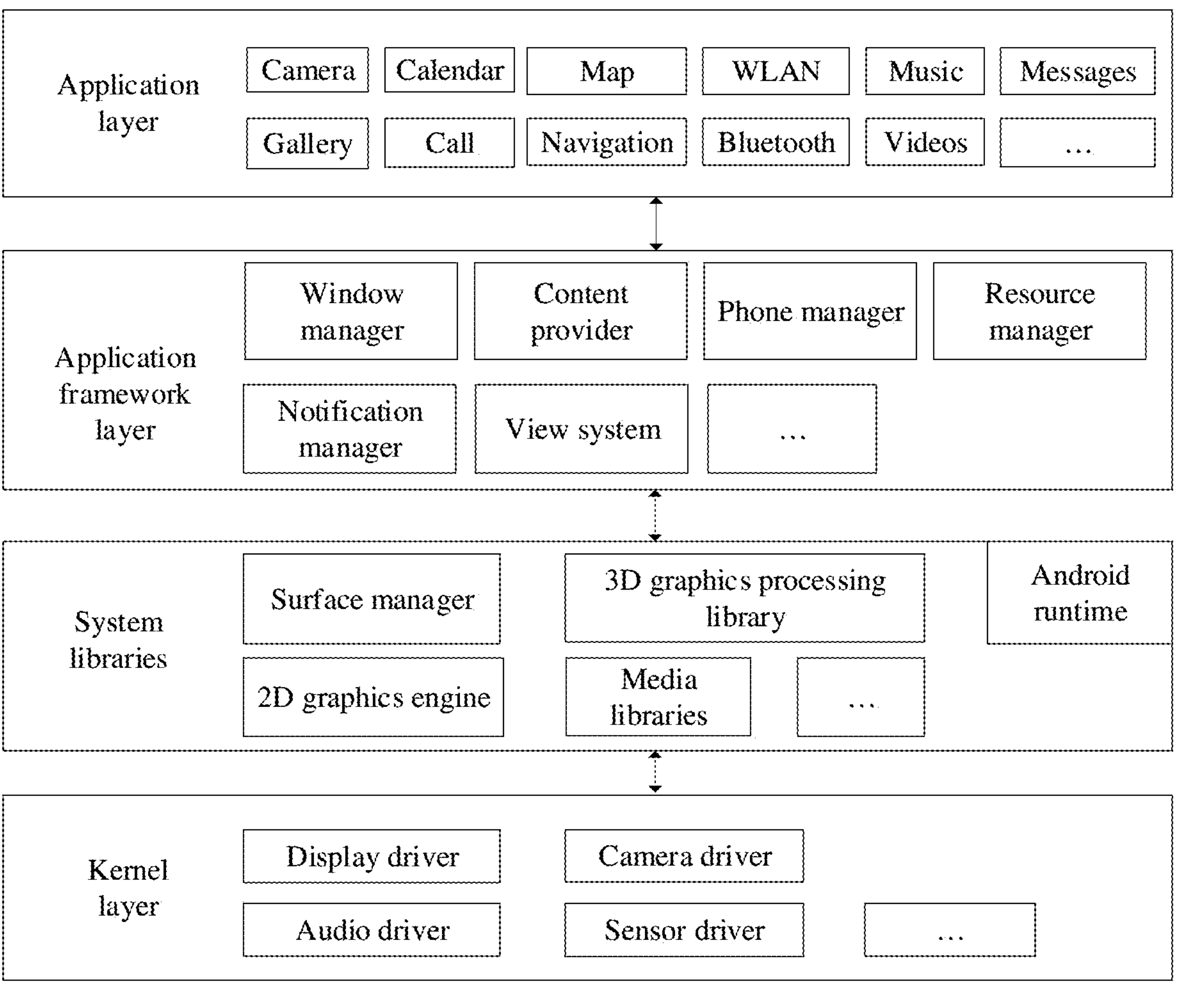
FIG. 2 is a block diagram of a software structure of an electronic device according to an embodiment of this application.

FIG. 2 is a block diagram of a software structure of the electronic device 100 according to an embodiment of this application.

In a layered architecture, software is divided into several layers, and each layer has a clear role and task. The layers communicate with each other through a software interface. In some embodiments, an Android system is divided into four layers: an application layer, an application framework layer, Android runtime (Android runtime) and system libraries, and a kernel layer from top to bottom.

The application layer may include a series of application packages.

As shown in FIG. 2, the application packages may include applications such as Camera, Gallery, Calendar, Call, Map, Navigation, WLAN, Bluetooth, Music, Videos, and Messages.

It should be noted that the application layer may include a system application from an electronic device manufacturer, and may also include a third-party application from another software manufacturer other than the electronic device manufacturer.

The application framework layer provides an application programming interface (application programming interface, API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and answered, a browsing history and bookmarks, a phone book, and the like.

The view system includes visual controls, for example, a control for displaying text and a control for displaying a picture. The view system is configured to construct an application. A display interface may include one or more views. For example, a display interface including a short message service message notification icon may include a view for displaying text and a view for displaying a picture.

The phone manager is configured to provide a communication function of the electronic device 100, for example, management of call states (including answering, declining, and the like).

The resource manager provides various resources such as a localized character string, an icon, a picture, a layout file, and a video file for an application.

The notification manager enables an application to display notification information in a status bar, and is configured to convey a notification message that may automatically disappear after a short pause without user interaction. For example, the notification manager is configured to notify download completion, provide a message notification, and the like. The notification manager may alternatively be a notification that appears in a top status bar of the system in a form of a graph or scroll bar text, for example, a notification of an application running in the background, or may be a notification that appears on a screen in a form of a dialog window. For example, text information is displayed in the status bar, a prompt tone is played, the electronic device vibrates, or an indicator light blinks.

The Android runtime includes a core library and a virtual machine. The Android runtime is responsible for scheduling and management of the Android system.

The core library includes two parts: a function to be called by the Java language, and a core library of Android.

The application layer and the application framework layer run on the virtual machine. The virtual machine executes Java files of the application layer and the application framework layer as binary files. The virtual machine is configured to implement functions such as object lifecycle management, stack management, thread management, security and exception management, and garbage collection.

The system libraries may include a plurality of functional modules, for example, a surface manager (surface manager), media libraries (Media Libraries), a 3D graphics processing library (for example, OpenGL ES), and a 2D graphics engine (for example, SGL).

The surface manager is configured to: manage a display subsystem and provide a fusion of 2D and 3D layers for a plurality of applications.

The media libraries support playback and recording in a plurality of commonly used audio and video formats, static image files, and the like. The media libraries may support a plurality of audio and video coding formats, for example, MPEG-4, H.264, MP3, AAC, AMR, JPG, and PNG.

The 3D graphics processing library is configured to implement 3D graphics drawing, image rendering, compositing, layer processing, and the like.

The 2D graphics engine is a drawing engine for 2D drawing.

In some implementations, the system libraries may further include a device authentication (HI chain) module. The device authentication module can ensure secure transmission of user personal data between a plurality of devices and a capability of establishing a secure connection between devices.

In some implementations, the system libraries may further include a telephony service (telephony). The telephony service provides a series of APIs for obtaining information about a cellular mobile network and a SIM card. An application may call an API to obtain a currently registered network name, a network service status, signal strength, and related information of a SIM card. In some implementations, the application may query, from the telephony service by using a software development kit (software development kit, SDK) of a network operator, the related information of the SIM card, request to enable the cellular mobile network, request to disable the cellular mobile network, or the like.

In some implementations, the system libraries may further include an account management service. The account management service may be used to manage an account to which an operating system of the electronic device is logged in, another account associated with the account, another electronic device, and the like.

The kernel layer is a layer between hardware and software. The kernel layer includes at least a display driver, a camera driver, an audio driver, and a sensor driver.

In some implementations, the kernel layer may further include a radio interface layer (radio interface layer, RIL). The RIL is configured to access a wireless modulation and demodulation processor to obtain the related information of the SIM card, and can use a function of the SIM card.

The following describes a working process of software and hardware of the electronic device 100 by using an example with reference to a login scenario of an application.

When an application on the electronic device 100 is started, the application obtains card information of the SIM card from the telephony service by using the SDK of the network operator. The SIM card may be connected to the electronic device 100 through the SIM card interface 160. The electronic device 100 displays the card information on the display 140, to facilitate confirmation or authorization by a user. When the electronic device 100 receives a confirmation operation or an authorization operation of the user, the application enables the cellular mobile network from the telephony service by using the SDK of the network operator. The telephony service communicates with an operator server based on the cellular mobile network, including performing login authentication for the application based on the card information.

To facilitate understanding of the technical solutions in embodiments of this application, the following first describes an application scenario of embodiments of this application.

Currently, there are more types of and a larger quantity of applications that can be installed on an electronic device. These applications may provide a user with various functions, for example, providing an entertainment program, audiovisual enjoyment, social communication, financial management, and the like. To ensure security of user data and provide more personalized services for users, increasingly more applications (especially third-party applications) need to authenticate identity information of the users.

In some implementations, when an application on the electronic device is started, the application may obtain and display the card information of the SIM card in the electronic device, and the user may tap the card information of the SIM card, to authorize login authentication based on the card information. The electronic device obtains a corresponding authentication result from the operator server based on the card information. The authentication result may indicate that the authentication succeeds or the authentication fails.

Figure 3:
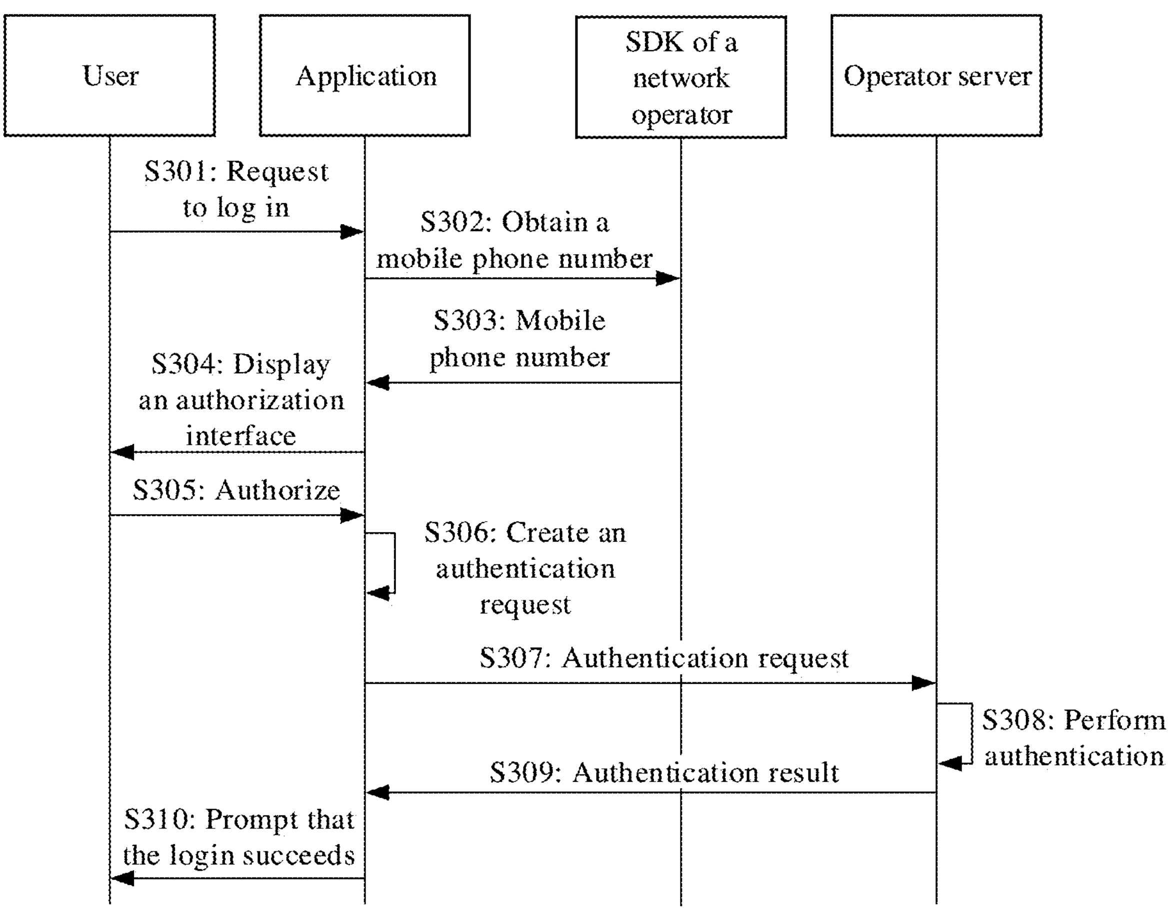
FIG. 3 is a flowchart of a login authentication method according to an embodiment of this application.

FIG. 3 shows a login authentication method according to an embodiment of this application.

S301: A user requests to log in to an application.

S302: The application requests to obtain a mobile phone number in a SIM card from an SDK of a network operator.

S303: The SDK of the operator returns the mobile phone number to the application.

In some implementations, the SDK of the operator may obtain the mobile phone number from an operator server.

S304: The application displays an authorization interface to the user.

The authorization interface may include a mobile phone number and an authorization option, to prompt the user to authorize one-click login based on the mobile phone number.

S305: The user performs authorization.

The user may tap the authorization option to perform authorization.

S306: The application creates an authentication request.

The application may create the authentication request based on the mobile phone number.

S307: The application sends the authentication request to the operator server.

S308: The operator server performs authentication.

S309: The operator server returns an authentication result to the application.

The authentication result may include that the authentication succeeds or the authentication fails.

S310: The application prompts the user that the login succeeds.

The application may display the authentication result to the user. When the authentication succeeds, the application may prompt the user that the login succeeds.

Authentication convenience can be improved to some extent in this authentication manner. However, if no SIM card is configured in an electronic device, or card information of a SIM card cannot be obtained due to other reasons, login authentication of the application cannot be completed. Therefore, to further improve convenience and reliability of login authentication, embodiments of this application provide another login authentication method and system.

Figure 4:
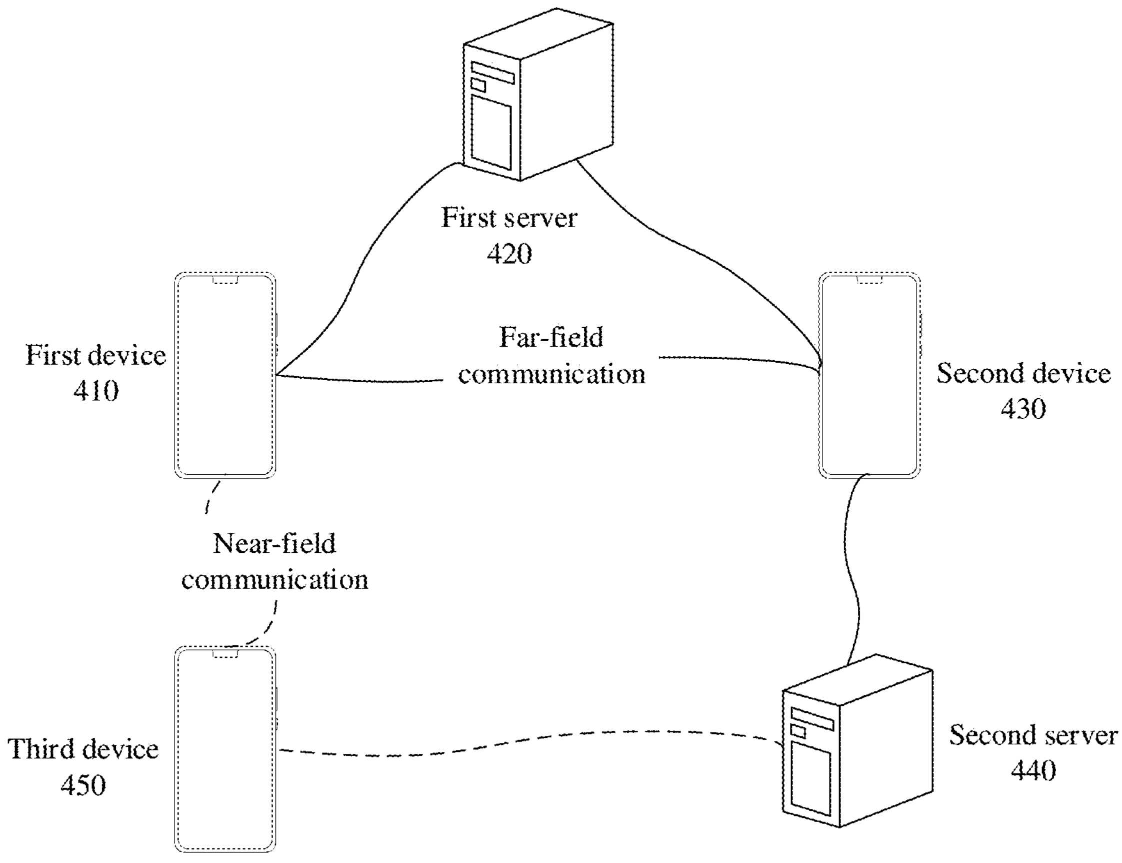
FIG. 4 is a schematic diagram of a login authentication scenario according to an embodiment of this application.

FIG. 4 is a schematic diagram of an application scenario according to an embodiment of this application. The scenario includes a first device 410, a first server 420, a second device 430, and a second server 440. The first device 410, the first server 420, the second device 430, and the second server 440 may be implemented by the electronic device 100. For example, the first device 410 and the second device 430 may be a mobile phone, a smartwatch, a tablet computer, a smart wearable device, a smart home device, an internet of things device, or the like. For example, the first server 420 may be a server of a manufacturer of the first device 410 and the second device 430.

The first device 410 may include an operating system and at least one application. In some implementations, the at least one application includes a third-party application. In some implementations, a user may register with the operating system, to obtain an account of the user. In some implementations, the user may log in to another device of a same manufacturer as the first device 410 based on the account. In other words, a plurality of devices may be logged in to a same account, and the plurality of devices are associated based on the account. In some implementations, the user may associate the account with another account to which another user logs in on another device. In other words, a plurality of devices that are logged in to different accounts may be associated based on an association relationship between the plurality of accounts. For example, there are a plurality of family members in a same family, each family member has a device, and each device is logged in to an account (namely, a member account). The member accounts of the plurality of family members may be all associated with a same family account. In this way, the plurality of member accounts are associated based on the same family account, and the devices logged in to the member accounts are also associated with each other.

In some implementations, the first device 410 is not configured with any SIM card. Therefore, the first device 410 may also be referred to as a cardless device. In some implementations, the first device 410 may be configured with a SIM card, but the SIM card cannot be used for login authentication of an application on the first device 410.

The second device 430 may be configured with at least one SIM card. In some implementations, the second device 430 and the first device 410 are logged in to a same account, for example, a first account. In some implementations, a logged-in account (for example, a second account) of the second device 430 and a logged-in account (for example, a first account) of the first device are associated with each other. In some implementations, a logged-in account of the second device 430 and a logged-in account of the first device are associated with another account (for example, a third account).

In some implementations, a plurality of devices that are associated with each other may trust each other. In some implementations, one device may exchange one or more types of data, for example, card information of a SIM card, with another associated device. In some implementations, one device may use one or more services and functions of another associated device. For example, the device uses a cellular mobile network of the another device.

In some implementations, a far-field network connection may be established between the first device 410 and the second device 430, to perform far-field communication through the far-field network connection. In some implementations, the first device 410 and the second device 430 may establish the far-field network connection in a peer-to-peer (peer-to-peer, P2P) traversal manner or a relay manner. An example in which the far-field network connection is established in the P2P traversal manner is used. The first device 410 and the second device 430 may establish, on respective gateways thereof, related entries through an intermediate device, so that data sent by one of the first device 410 and the second device 430 can directly penetrate the gateway of the other one and reach the other one. It may be understood that, in practice, the first device 410 and the second device 430 may alternatively establish the far-field network connection in another manner. A manner of establishing the far-field network connection and a type of the far-field network connection are not limited in this embodiment of this application.

The first server 420 is configured to: obtain device information of any device (for example, the first device 410 or the second device 430), and provide the device information of the device for another device. The device information may include identity information, configuration information, card information of a configured SIM card, a logged-in account, and the like of the device. The configuration information may indicate whether the device has a SIM card. In addition, it should be noted that, in practice, the device information may alternatively include more or less information related to the device. In some implementations, the first server 420 is configured to manage a logged-in account of a device, an association relationship between devices, and an association relationship between accounts. The first server 420 may determine, based on the logged-in account of the device, the association relationship between devices, and the association relationship between accounts, whether the two devices are associated. In some implementations, the first server 420 may provide, for any device, device information of another device associated with the device. In some implementations, the first server 420 may receive the following content submitted by any device: a logged-in account of the device, an association relationship between devices, and an association relationship between accounts. In some implementations, the first server 420 may provide, for any device, another device associated with the device and another account associated with a logged-in account of the device.

For example, if a user 1 logs in to the first account on the first device 410, and then logs in to the first account on the second device 430, the first server 420 may determine that both the first device 410 and the second device 430 are logged in to the first account.

For another example, a user 1 logs in to the first account on the first device 410, and a user 2 logs in to the second account on the second device 430. The user 1 sends an association request 1 to the second device 430 by using the first device 410. The association request 1 is used to request to establish an association relationship between the first account and the second account. The second device 430 receives and displays the association request 1 to the user 2. When receiving an authorization operation of the user 2 in response to the association request 1, the second device 430 sends the association relationship between the first account and the second account to the first server 420.

For another example, a user 1 logs in to the first account on the first device 410, and a user 2 logs in to the second account on the second device 430. The user 1 sends an association request 2 to the first server 420 by using the first device 410. The association request 2 is used to request to establish an association relationship between the first account and the third account. The user 2 sends an association request 3 to the first server 420 by using the second device 430. The association request 3 is used to request to establish an association relationship between the second account and the third account. When receiving the association request 2 and the association request 3, the first server 420 may store the association relationship between the first account and the third account and the association relationship between the second account and the third account. The first server 420 may determine, based on the third account, that the first account and the second account are also associated with each other, or the first server 420 may directly store the association relationship between the first account and the second account.

Specifically, the user 1 and the user 2 are family members in a same family 1. The user 2 logs in to the second account and the third account on the second device 430, sets the second account as a personal account, and sets the third account as a family account. The first server 420 may establish the association relationship between the second account and the third account. The user 1 logs in to the first account on the first device 410 and sets the first account as a personal account. The user 1 requests, by using the first device 410, the first server 420 to associate the first account with the third account. The first server 420 establishes a relationship between the first account and the third account, and may further determine that the first account and the second account are associated based on the third account. In other words, the personal account of the user 1 and the personal account of the user 2 are logged in to a same family account, and the personal account of the user 1 and the personal account of the user 2 are associated based on the family account.

In some implementations, card information of a SIM card may include at least one of a mobile subscriber international ISDN/PSTN number (mobile subscriber international ISDN/PSTN number) MSISDN, an international mobile subscriber identity (international mobile subscriber identity, IMSI), or a network operator. It may be understood that, in practice, the card information may alternatively include more or less information related to the SIM card.

The second server 440 may provide a login authentication service for any device (for example, the first device 410 or the second device 430). In some implementations, the second server 440 may obtain an authentication request from the device, and return an authentication result to the device. In some implementations, the second server 440 may be a server of the network operator.

In some implementations, the scenario may further include a third device 450. The third device 450 may be a device that is located near the first device 410 and that is configured with at least one SIM card. The third device 450 may be implemented by the electronic device 100. For example, the third device 450 may be a mobile phone, a smartwatch, a tablet computer, a smart wearable device, a smart home device, an internet of things device, or the like.

In some implementations, a near-field network connection may be established between the first device 410 and the third device 450, to implement near-field communication. For example, the near-field network connection may implement near-field communication via WLAN, BT, Wi-Fi, or in a like manner. It may be understood that, in practice, the near-field network connection may also implement near-field communication in another manner. A manner of establishing the near-field network connection, a type of the near-field network connection, and a manner of near-field communication are not limited in this embodiment of this application.

It may be learned from the foregoing that the first device 410 may be a cardless device, or does not include a SIM card for performing login authentication for an application. Each of the second device 430 and the third device 450 is configured with at least one SIM card. Therefore, the first device may obtain card information of the SIM card in the second device 430 or the third device 450, and use the card information for login authentication of the application, thereby improving convenience and reliability of login authentication.

In some implementations, the first device 410 may select one of a plurality of other devices (for example, the second device 430 and the third device 450) as a source of the card information of the SIM card. In some implementations, the first device 410 and the second device 430 are devices associated with each other, and the second device 430 has higher security and reliability for the first device 410. Therefore, the first device 410 may preferentially obtain the card information of the SIM card from the second device 430. In some implementations, far-field communication may be performed between the first device 410 and the second device 430, and near-field communication may be performed between the first device 410 and the third device 450. In other words, the first device 410 may establish a connection to and communicate with the third device 450 more easily. Therefore, the first device 410 may preferentially obtain the card information of the SIM card from the third device 450, to further improve the convenience and the efficiency of login authentication.

In some implementations, the first device 410 may select card information of one SIM card from card information of a plurality of SIM cards, and use the selected card information of the SIM card for login authentication of an application. The plurality of SIM cards may be SIM cards in a same device, or may be SIM cards in different devices.

Figure 5:
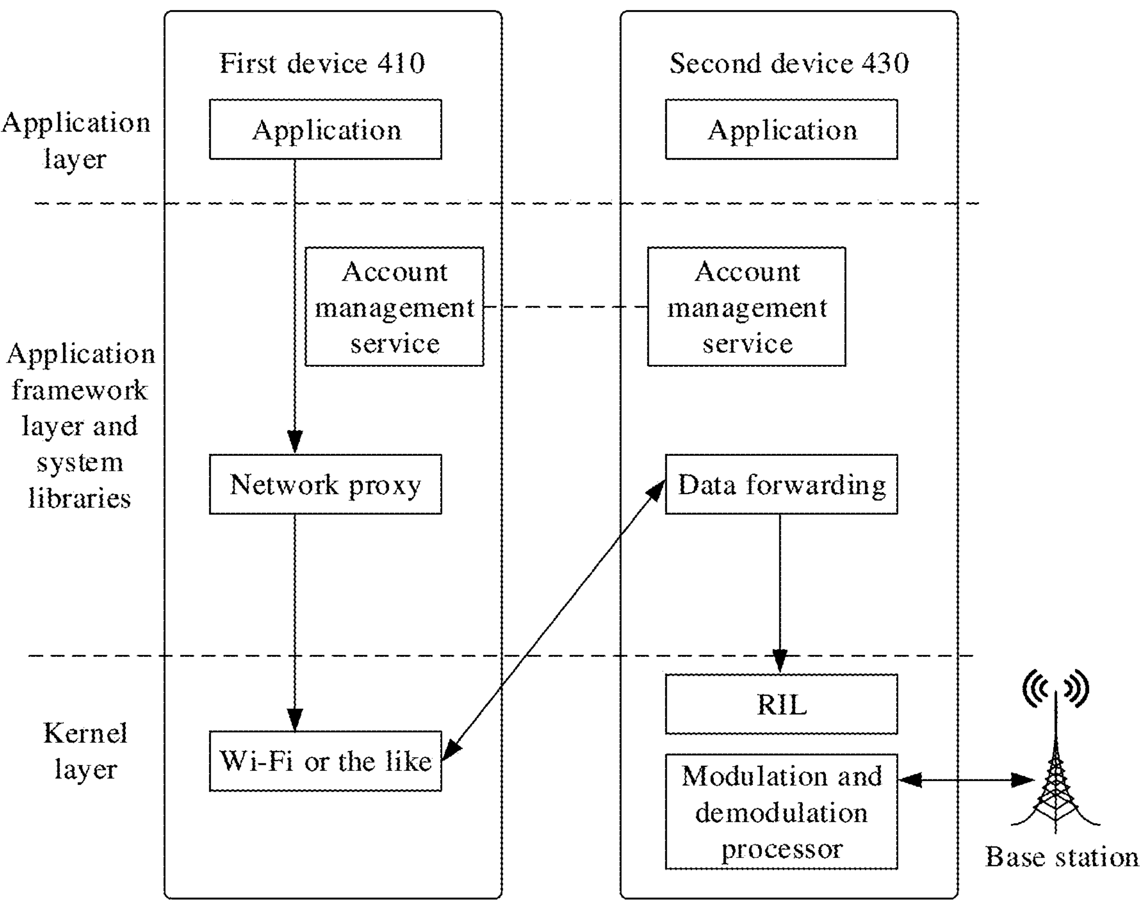
FIG. 5 is a schematic diagram of a communication manner according to an embodiment of this application.

FIG. 5 is a schematic diagram of a communication manner between the first device 410 and the second device 430 according to an embodiment of this application.

The first device 410 and the second device 430 establish an association relationship based on an account management service, including authentication as same-account devices or family-account devices. After the first device 410 establishes the association relationship with the second device 430, the first device 410 may establish a far-field network connection with the second device 430, and the first device 410 and the second device 430 may communicate through the far-field network connection.

An example in which the first device 410 sends data by using a cellular mobile network of the second device 430 is used. When an application on the first device 410 needs to send data, the first device 410 may send the data to a kernel layer by using a network proxy, and then send the data to the second device 430 through the far-field network connection. The second device 430 forwards the data to the kernel layer, and then controls a modulation and demodulation processor of the second device 430 through a RIL, to connect to the cellular mobile network by using the second device 430, send the data to a base station through the cellular mobile network, and then send the data to another device like the second server 440.

Specific embodiments are used below to describe in detail the technical solutions of this application. The following several specific embodiments may be combined with each other, and a same or similar concept or process may not be described repeatedly in some embodiments.

FIG. 6 is a flowchart of a login authentication method according to an embodiment of this application. It should be noted that the method is not limited to a specific sequence described in FIG. 6 and below. It should be understood that in another embodiment, a sequence of some steps in the method may be exchanged based on an actual requirement, or some steps in the method may be omitted or deleted. The method includes the following steps.

S601: The first device 410 establishes an association relationship with the second device 430.

The first device 410 establishes the association relationship with the second device 430, so that the first device 410 and the second device 430 can be associated with each other.

In some implementations, when the first device 410 establishes the association relationship with the second device 430, the first device 410 and the second device 430 may trust each other. In some implementations, when the first device 410 establishes the association relationship with the second device 430, the first device 410 may exchange data with the second device 430. In some implementations, when the first device 410 establishes the association relationship with the second device 430, the first device 410 and the second device 430 may use services and functions of each other.

In some implementations, the association relationship between the first device 410 and the second device 430 may include that the first device 410 and the second device 430 are logged in to a same account, for example, a first account. Because the first device 410 and the second device 430 are associated based on a same account, a type of the association relationship may be same-account association.

For example, a user may log in to the first account on the first device 410, and the first device 410 may send the first account and identity information of the first device 410 to the first server 420. The user may further log in to the first account on the second device 430, and the second device 430 sends the first account and identity information of the second device 430 to the first server 420. The first server 420 receives the first account, the identity information of the first device 410, and the identity information of the second device 430, and determines that both the first device 410 and the second device 430 are logged in to the first account, that is, the first device 410 and the second device 430 are authenticated based on the same account. It may be understood that, in practice, the first device 410 and the second device 430 may alternatively be authenticated based on the same account in another manner.

In some implementations, the association relationship between the first device 410 and the second device 430 may include that a logged-in account of the first device 410 is different from a logged-in account of the second device 430, but the logged-in account of the first device 410 is associated with the logged-in account of the second device 430, that is, the second device 430 is associated with the logged-in account of the first device 410. In some implementations, the first device 410 is logged in to the first account, the second device 430 is logged in to a second account, and the first account is associated with the second account. In some implementations, that the first account is associated with the second account may include that the first account is directly associated with the second account. In some implementations, that the first account is associated with the second account may include that the first account is indirectly associated with the second account based on at least one another account. For example, the first account is associated with a third account, and the second account is also associated with the third account. In this case, the first account is also associated with the second account. Because the first device 410 and the second device 430 are associated based on a plurality of accounts, a type of the association relationship may be multi-account association.

For example, the user may log in to the first account on the first device 410, and another user may log in to the second account on the second device 430. The first server 420 stores the identity information of the first device 410 that is logged in to the first account and the identity information of the second device 430 that is logged in to the second account. The first device 410 sends an association request to the second device 430 by using the first server 420. The association request is used to request to associate the first account with the second account. When receiving a confirmation operation based on the association request, the second device 430 indicates, to the first device 410, that the association succeeds. The first server 420 stores an association relationship between the first account and the second account, to establish the association relationship between the first device 410 and the second device 430.

In some implementations, the first device 410 and the second device 430 may each include a device authentication module, and the first device 410 and the second device 430 may perform mutual authentication and establish the association relationship by using the device authentication modules.

It may be understood that the first device 410 and the second device 430 may establish the association relationship in advance, or the first device 410 and the second device 430 are often or always associated with each other. Therefore, S601 may be omitted.

S602: The second device 430 sends device information of the second device 430 to the first server 420.

In some implementations, the device information of the second device 430 may include the identity information of the second device 430. In some implementations, the device information of the second device 430 may include configuration information of the second device 430. The configuration information may indicate whether the second device 430 is configured with a SIM card. In some implementations, the device information of the second device 430 may include card information of a SIM card in the second device 430. In some implementations, the device information of the second device 430 may include a logged-in account of the second device 430. It may be understood that, in practice, the device information of the second device 430 may alternatively include more or less information related to the second device 430.

It should be noted that the second device 430 may alternatively send the device information of the second device 430 to the second server 440 at any other occasion, without being limited to after the first device 410 establishes the association relationship with the second device 430. In some implementations, when detecting that the device information of the second device 430 is updated, the second device 430 may send updated device information to the first server 420. In some implementations, the second device 430 may periodically synchronize information with the first server 420, so that device information stored in the first server 420 is consistent with actual device information of the second device 430.

S603: The first device 410 obtains the device information of the second device 430 from the first server 420.

In some implementations, the device information that is of the second device 430 and that is obtained by the first device 410 from the first server 420 includes the configuration information of the second device 430. In this case, when the second device 430 is configured with a SIM card, the first device 410 may obtain, from the first server 420 or the second device 430, card information of the SIM card in the second device 430.

In some implementations, the device information that is of the second device 430 and that is obtained by the first device 410 from the first server 420 may include the card information of the SIM card in the second device 430.

In some implementations, the first device 410 may obtain the device information of the second device 430 from the first server 420 when detecting a specific event. In some implementations, the specific event may include detecting that an application on the first device 410 calls an interface related to a cellular mobile network, like getphoneinfo or getnetworktype, or that the first device 410 is powered on. Certainly, in practice, the specific event may alternatively include more or fewer events.

S604: The first device 410 performs login authentication for an application based on card information of a first SIM card in the second device 430.

When obtaining the card information of the first SIM card in the second device 430, the first device 410 may communicate, based on the card information, with a network operator (for example, the second server) corresponding to the SIM card, to perform login authentication for any application on the first device 410.

It should be noted that an occasion for performing login authentication for an application is not limited in this embodiment of this application. In some implementations, the occasion may be set by a developer of the application in advance. In some implementations, the first device 410 may perform login authentication for the application when detecting a specific operation like startup, transfer, or payment of the application.

In addition, it may be understood that the card information that is of the first SIM card and that is obtained by the first device 410 may be used for login authentication of a plurality of applications, or may be used for login authentication of one application for a plurality of times.

In this embodiment of this application, the first device 410 may establish the association relationship with the second device 430, and obtain the device information of the second device from the first server 420. The first device 410 may determine, based on the device information, whether the second device 430 is configured with a SIM card, or directly determine, based on the device information, card information of a SIM card in the second device 430. In this case, when the second device 430 is configured with a SIM card, the first device 410 may obtain the card information of the first SIM card in the second device 430, and uses the card information to perform login authentication for an application on the first device 410. This ensures that when the first device 410 is configured with no SIM card or no SIM card for performing login authentication for the application, card information can still be obtained from another device associated with the first device 410 to perform login authentication for the application. This improves convenience and reliability of login authentication. When more devices establish an association relationship with the first device 410 and the devices associated with the first device 410 are configured with more SIM cards, the first device 410 can obtain more card information of the SIM cards, and effect of improving the convenience and the reliability of login authentication is better.

For example, a family 1 includes a member 1, a member 2, and a member 3, each member has one electronic device, and each electronic device is configured with two SIM cards. In this case, the electronic device of the member 1, the electronic device of the member 2, and the electronic device of the member 3 may be associated with each other. Therefore, the electronic device of each member may obtain card information of six SIM cards to perform login authentication for an application. Even if an electronic device of a member becomes a cardless device because a SIM card is deleted, the electronic device may still obtain card information of four SIM cards in the other two electronic devices, that is, login authentication of an application can still be performed conveniently and reliably.

In some implementations, the first device 410 may also send device information of the first device 410 to the first server 420, and the second device 430 may also obtain card information of a SIM card of the first device 410 and perform login authentication for an application on the second device 430 based on the card information.

In some implementations, the first device 410, the first server 420, and the second device 430 may perform information synchronization, including synchronization of at least one type of information, like device information, an association relationship between accounts, and an association relationship between devices. Through information synchronization, information stored in the first server may be consistent with actual information such as the device information, the association relationship between accounts, and the association relationship between devices.

FIG. 7 is a flowchart of a login authentication method according to an embodiment of this application. It should be noted that the method is not limited to a specific sequence described in FIG. 7 and below. It should be understood that in another embodiment, a sequence of some steps in the method may be exchanged based on an actual requirement, or some steps in the method may be omitted or deleted. The method includes the following steps.

S701: The first device 410 sends a first obtaining request to the first server 420.

In some implementations, the first obtaining request may be used to request to obtain device information of another device associated with the first device. In some implementations, the first obtaining request may carry at least one of identity information of the first device 410 and a first account to which the first device 410 is logged in.

In some implementations, the first obtaining request may carry at least one screening parameter, to request to obtain device information of a device that is associated with the first device and that matches the screening parameter. In some implementations, the first obtaining request may carry an association relationship type. In some implementations, the association relationship type includes at least one of same-account association and multi-account association. In some implementations, the first obtaining request may carry a network operator.

S702: The first server 420 sends device information of a first device set to the first device 410 in response to the first obtaining request, where each device in the first device set is associated with the first device, the first device set includes a second device, and the second device is configured with a first SIM card.

In some implementations, the device information of the first device set includes configuration information of each device in the first device set, and the configuration information of each device indicates whether the device is configured with a SIM card, thereby indicating, to the first device, the devices that are associated with the first device and that are configured with SIM cards. The device information of the first device set includes configuration information of each device in the first device set, that is, the first server 420 may indicate, to the first device 410, whether each device associated with the first device 410 is configured with a SIM card. This helps the first device 410 select the second device from the devices configured with the SIM cards more quickly and more accurately, and further improves efficiency of login authentication.

In some implementations, the device information of the first device set includes identity information of each device in the first device set, to describe, to the first device, an identity of each device associated with the first device.

In some implementations, the device information of the first device set may include card information of SIM cards configured for at least some devices in the first device set, so that the card information of at least one SIM card is directly indicated to the first device.

It may be understood that the device information of the first device set may alternatively include more or less information related to at least one device in the first device set.

In some implementations, the first device set may include at least one of a second device set and a third device set. The second device set includes at least one device, and each device in the second device set is logged in to a same account as the first device 410. The third device set includes at least one device, and each device in the third device set is associated with a logged-in account of the first device 410.

In some implementations, each device in the first device set is configured with a SIM card. In some implementations, the first server 420 may obtain, based on configuration information of a plurality of other devices associated with the first device 410, devices configured with SIM cards from the plurality of other devices as the first device set. That is, the first server 420 may accurately indicate, to the first device 410, devices that are associated with the first device 410 and that are configured with SIM cards. This further helps the first device 410 determine the second device from the devices that are associated with the first device and that are configured with the SIM cards, and further improves the efficiency of login authentication.

In some implementations, the first device set may include at least some devices that are not configured with a SIM card.

In some implementations, if the first obtaining request may carry at least one screening parameter, the first server 420 may return, to the first device 410, device information of a device that is associated with the first device 410 and that matches the screening parameter. This improves accuracy of querying device information. In some implementations, if the association relationship type carried in the first obtaining request includes the same-account association, the first device set may include the second device set; or if the association relationship type carried in the first obtaining request includes the multi-account association, the first device set may include the third device set. In some implementations, if the first obtaining request carries the network operator, the first device set may include a device that is associated with the first device 410 and that is configured with a SIM card corresponding to the network operator.

S703: The first device 410 performs login authentication for an application on the first device 410 based on card information of the first SIM card.

In some implementations, the second device may be a device specified by a user, or the second device may be a device determined by the first device 410 from the first device set in a preset selection manner.

It should be noted that a manner of performing S703 by the first device 410 may be similar to or the same as a manner of performing S604.

In this embodiment of this application, the first device 410 may obtain the device information of the first device set from the first server 420. The first device 410 may determine, based on the device information of the first device set, at least one device associated with the first device, where the at least one device includes the second device. In this case, the first device 410 may perform login authentication for the application based on the card information of the first SIM card in the second device. This improves convenience and reliability of login authentication.

In some implementations, S701 may be omitted, that is, the first server 420 may actively send the device information of the first device set to the first device 410.

In some implementations, the first server 420 may send the device information of the first device set to the first device 410 when detecting that the first device 410 is logged in to the first account.

In some implementations, the first server 420 may send the device information of the first device set to the first device 410 when establishing a network connection with the first device 410.

In some implementations, when detecting that the device information that is of the first device set and that is stored in the first server 420 is updated, the first server 420 may send updated device information of the first device set to the first device 410.

For example, when detecting that a device associated with the first device 410 is newly added, a device associated with the first device 410 is removed, or device information of any device associated with the first device 410 changes, the first server 420 updates the stored device information of the first device set, and sends the updated device information of the first device set to the first device 410.

Certainly, in practice, the first server 420 may alternatively actively send the device information of the first device set to the first device 410 on another occasion.

Figure 8:
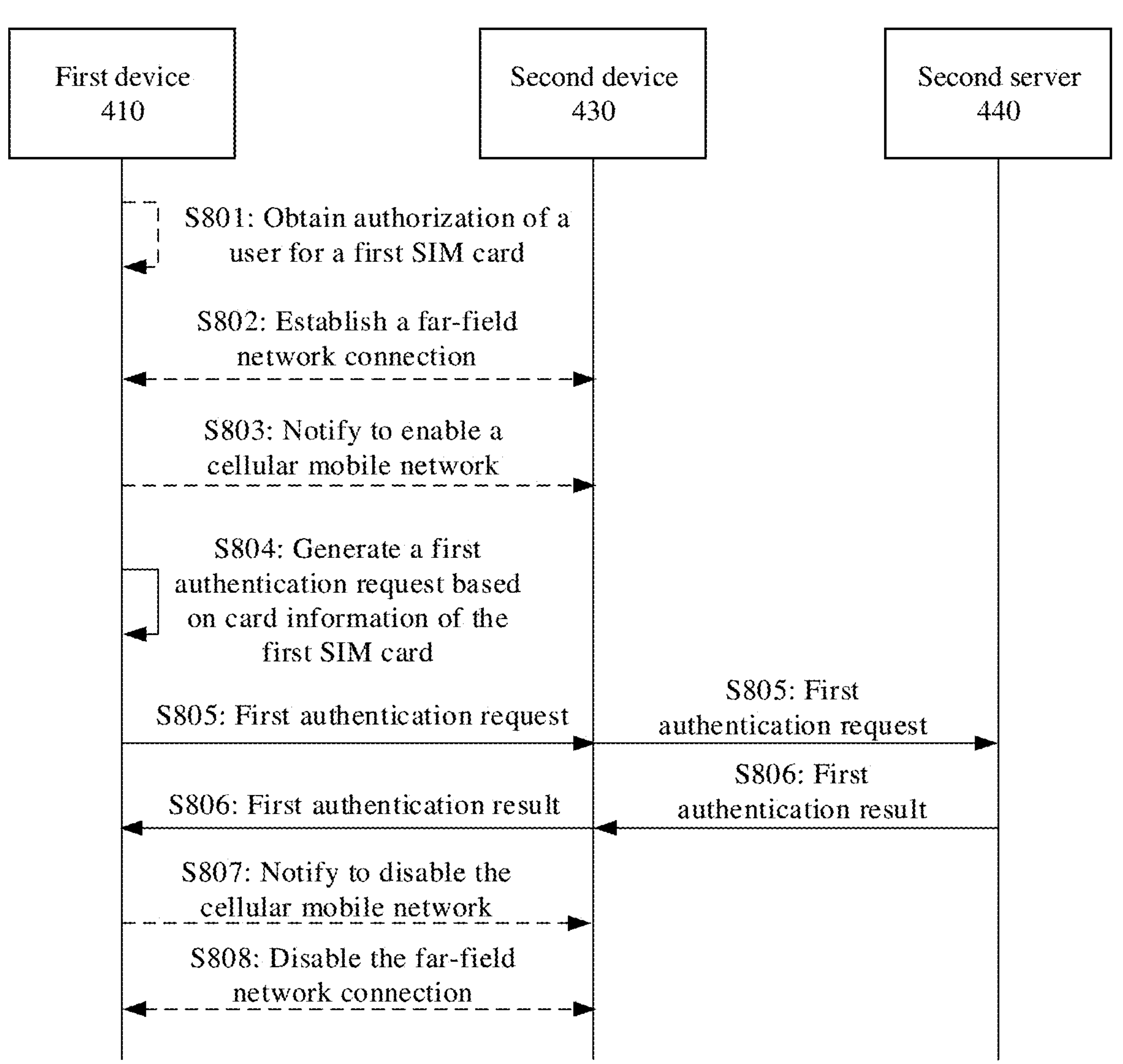
FIG. 8 is a flowchart of another login authentication method according to an embodiment of this application.

FIG. 8 is a flowchart of a login authentication method according to an embodiment of this application. The method may be used as a detailed description of S604 and S703. It should be noted that the method is not limited to a specific sequence described in FIG. 8 and below. It should be understood that in another embodiment, a sequence of some steps in the method may be exchanged based on an actual requirement, or some steps in the method may be omitted or deleted. The method includes the following steps.

S801: A first device 410 obtains authorization of a user for a first SIM card.

The first device 410 may prompt the user to authorize to perform login authentication for an application based on card information of the first SIM card. In some implementations, the first device 410 may display the card information of the first SIM card. If an authorization operation of the user is received based on the card information of the first SIM card, it can be determined that the authorization of the user for the first SIM card is obtained.

Figure 9:
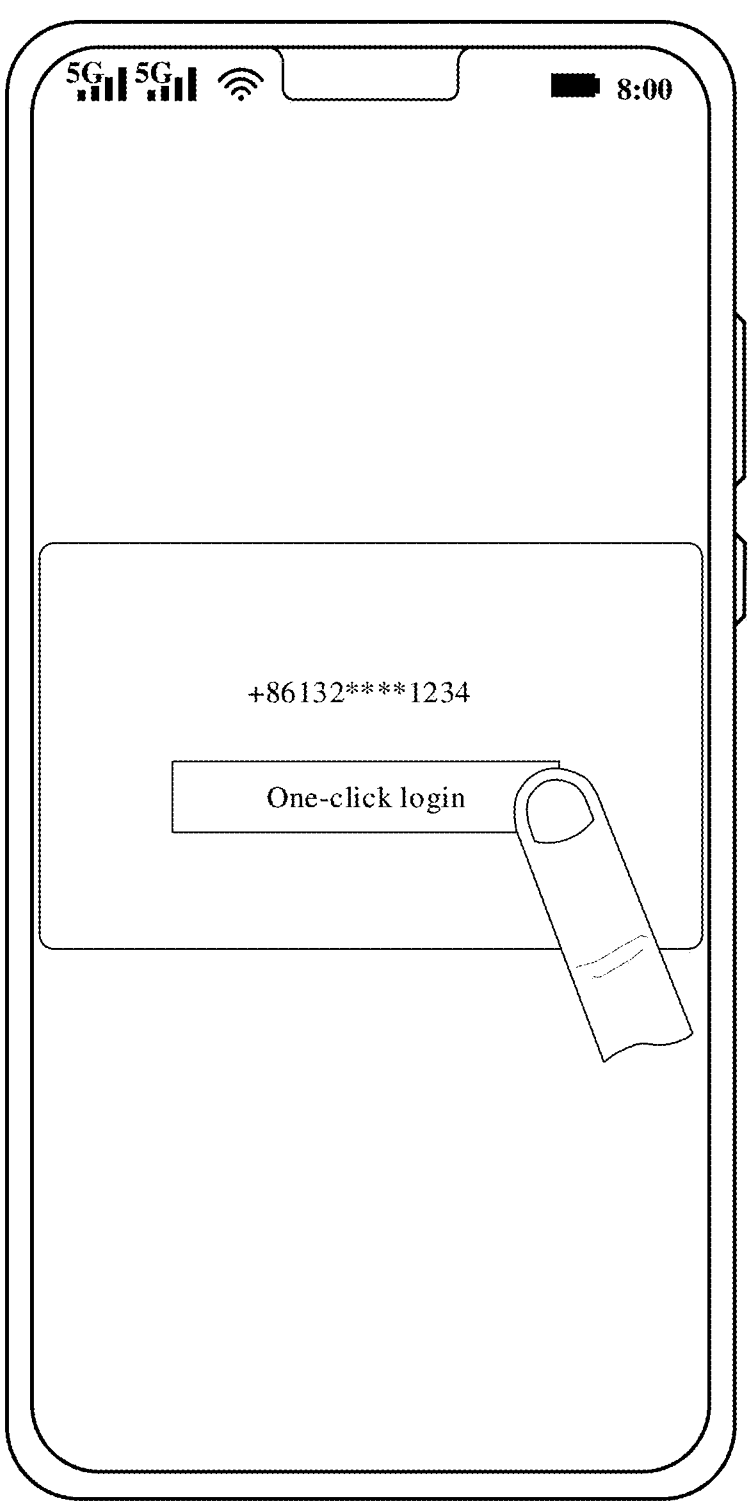
FIG. 9 is a schematic diagram of a display interface according to an embodiment of this application.

For example, the first device 410 may display a first interface shown in FIG. 9. The first interface includes card information "+86132**1234" of the first SIM card and a "One-click login" option. When the first device 410 receives a tap operation of the user based on the "One-click login" option, the first device 410 obtains authorization of the user for "+86132**1234".

In some implementations, the first device 410 may display a first card set, and determine the first SIM card from the first card set. The first card set includes at least one SIM card, and any SIM card in the first card set is configured in any device in the first device set. The first device 410 displays the first card set including the at least one SIM card, to prompt the user that the at least one SIM card may be currently used for login authentication, so that the user determines the first SIM card from the at least one SIM card and performs authorization. This improves reliability of login authentication.

It should be noted that any two SIM cards in the first card set may be separately configured on different devices, or may be configured on a same device. In some implementations, the first device 410 may obtain card information of SIM cards configured for at least some devices that are in the first device set and that are configured with SIM cards, to obtain the first card set.

Figure 10:
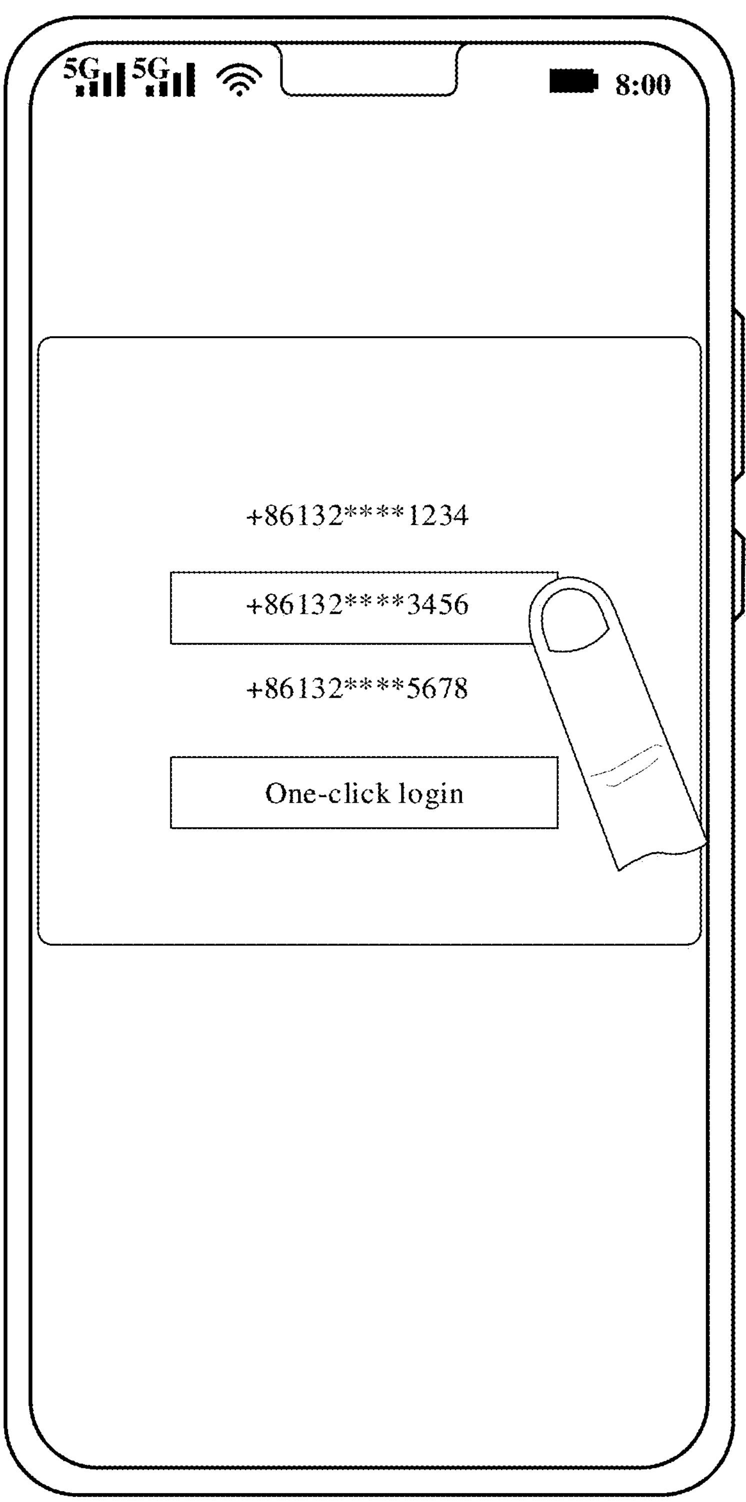
FIG. 10 is a schematic diagram of another display interface according to an embodiment of this application.

For example, the first device 410 may display a second interface shown in FIG. 10. The second interface includes card information of three SIM cards: "+86132**1234", "+861323456", and "+861325678". The second interface further includes a "One-click login" option. When the first device 410 receives a tap operation of the user based on "+861323456", "+861323456" is determined as the card information of the first SIM card. When the first device 410 receives a tap operation of the user based on the "One-click login" option, the first device 410 obtains authorization of the user for "+86132**3456".

In some implementations, the first device 410 may further display more information related to a SIM card, so that the user selects the first SIM card more accurately. In some implementations, the first device 410 may further display a type of an association relationship between a device in which the SIM card is located and the first device 410. In some implementations, the first device 410 may display one or more types of device information of the device in which the SIM card is located, for example, identity information and a network operator.

Figure 11:
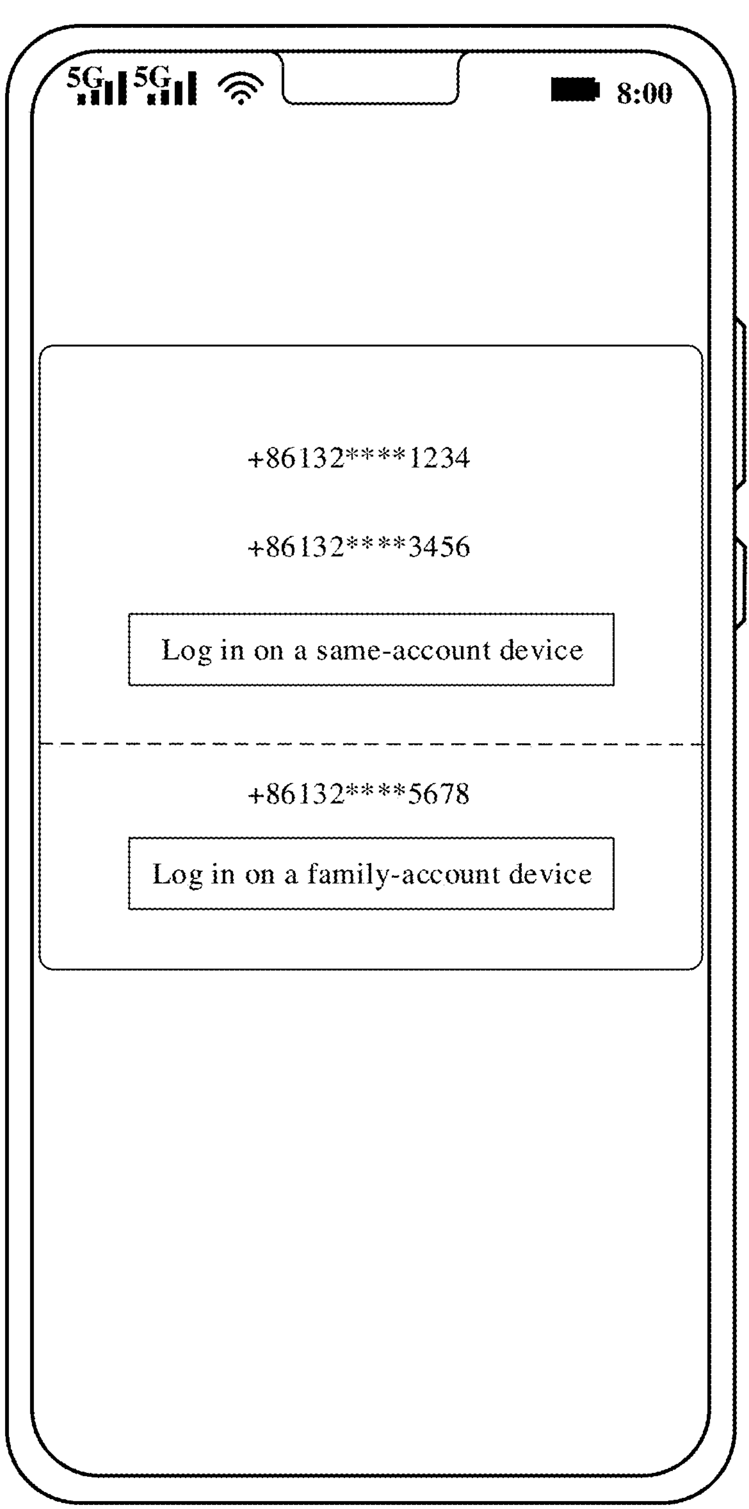
FIG. 11 is a schematic diagram of another display interface according to an embodiment of this application.

For example, the first device 410 may display a third interface shown in FIG. 11. The third interface includes card information of three SIM cards: "+86132**1234", "+861323456", and "+861325678". An association relationship between the first device 410 and devices in which "+861321234" and "+861323456" are located is same-account association. Therefore, the third interface further includes a "Log in on a same-account device" option. An association relationship between a device in which "+861325678" is located and the first device 410 is multi-account association. To be specific, the device in which "+861325678" is located and the first device 410** are a plurality of devices under a same family account. Therefore, the third interface further includes a "Log in with a family account option".

In some implementations, the first device 410 may display a second card set. The second card set includes at least one SIM card, and each SIM card in the second card set is configured in any device in a second device set. The first device may determine the first SIM card from the second card set. If the first device 410 determines that the second card set does not include the first SIM card, the first device 410 may display a third card set. The third card set includes at least one SIM card, and any SIM card in the third card set is configured in any device in a third device set. The first device 410 may determine the first SIM card from the third card set. Because a type of association between devices in the second device set and the first device 410 is same-account association, and a type of association between devices in the third device set and the first device 410 is multi-account association, a relationship between the devices in the second device set and the first device 410 is closer, and a degree of mutual trust between the devices in the second device set and the first device 410 is higher. Therefore, the second card set may be preferentially displayed. If the card information of the first SIM card cannot be determined from the second card set, the third card set is displayed, to determine the first SIM card from the third card set. This progressive display manner conforms to a use habit of the user, and can also reduce an amount of information displayed to the user each time, so that the user can more accurately determine the card information of the first SIM card. Certainly, the first device 410 may alternatively first display the third card set, and determine the first SIM card from the third card set. If the first device 410 determines that the third card set does not include the first SIM card, the first device 410 may display the second card set, and determine the first SIM card from the second card set.

In some implementations, the first device 410 may obtain card information of SIM cards configured for at least some devices that are in the second device set and that are configured with SIM cards, to obtain the second card set. In some implementations, the first device 410 may obtain card information of SIM cards configured for at least some devices that are in the third device set and that are configured with SIM cards, to obtain the third card set.

In some implementations, the first device 410 may display a fourth card set. The fourth card set includes at least one SIM card, and each SIM card in the fourth card set is configured in a near field device of the first device 410. The fourth card set includes a second SIM card, and the second SIM card is configured in a third device. The near field device of the first device 410 may be a device that is located in a specific range of the first device 410 and that can establish a near-field network connection with the first device 410. The first device may perform login authentication for the application based on card information of the second SIM card.

In some implementations, the first device 410 may display a fifth card set. The fifth card set includes at least one SIM card, and each SIM card in the fifth card set is configured in the first device 410. The fifth card set includes a third SIM card. The first device 410 may perform login authentication for the application based on card information of the third SIM card.

Figure 12:
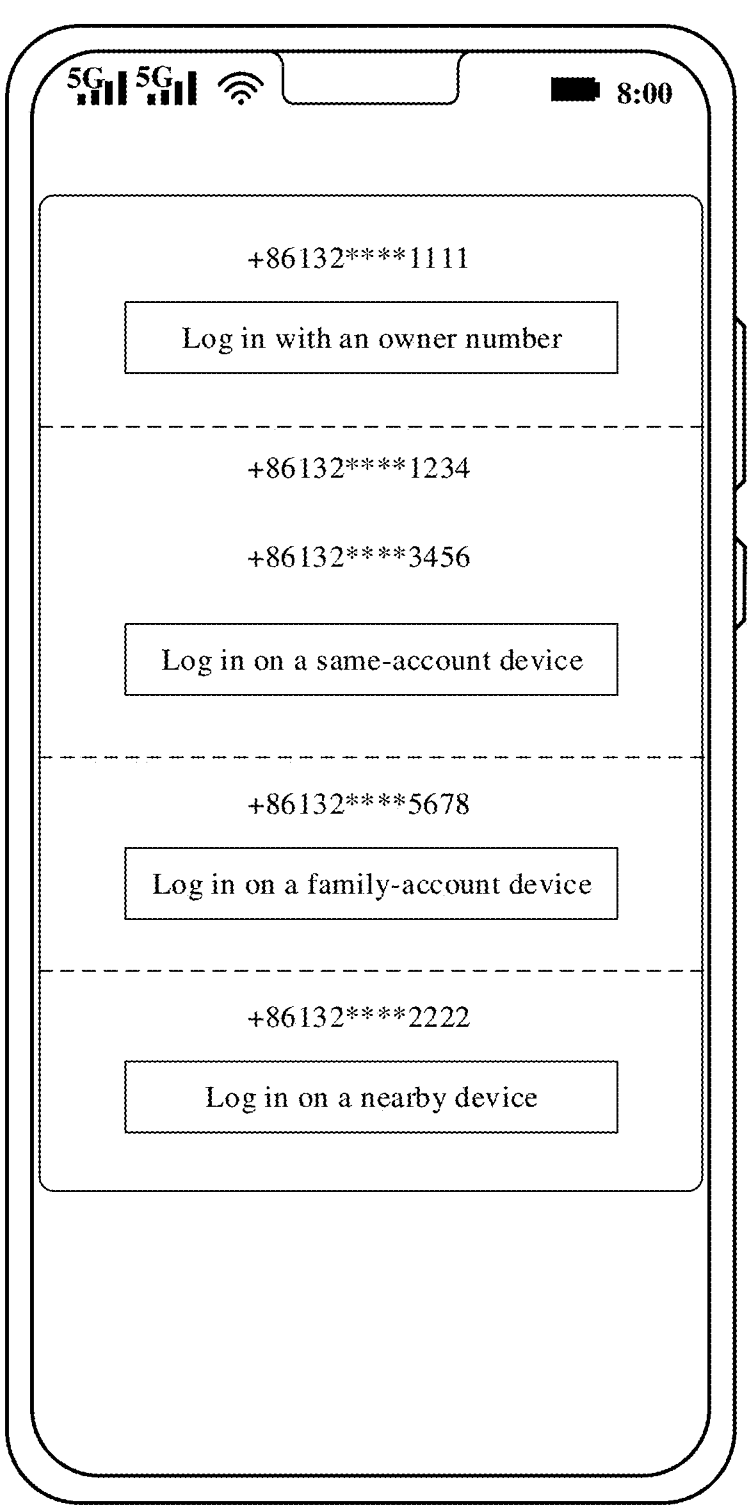
FIG. 12 is a schematic diagram of another display interface according to an embodiment of this application.

For example, the first device 410 may display a fourth interface shown in FIG. 12. The fourth interface includes card information of five SIM cards: "+86132**1111", "+861321234", "+861323456", "+861325678", and "+861322222". "+861321111" is a SIM card in the fifth card set, and is configured locally on the first device 410. Therefore, the fourth interface further includes a "Log in with an owner number" option. "+861321234" and "+861323456" are SIM cards in the second card set, and are configured on other devices that have a same account as the first device 410. Therefore, the fourth interface further includes a "Log in on a same-account device" option. "+861325678" is a SIM card in the third card set, and is configured on another device that has a same family account as the first device 410. Therefore, the fourth interface further includes a "Log in on a family-account device" option. "+861322222" is a card in the third card set, and is configured on another device near the first device 410. Therefore, the fourth interface further includes a "Log in on a nearby device" option. When the first device 410 receives a selection operation of the user based on any one of "+861321234", "+861323456", and "+861325678", card information selected by the user is determined as the card information of the first SIM card, a device in which the first SIM card is located is a second device, and login authentication of the application may be performed based on the card information. When the first device 410 receives a selection operation of the user based on "+861321111", "+861321111" is determined as the card information of the third SIM card, and login authentication of the application may be performed based on the card information. When the first device 410 receives a selection operation of the user based on "+861322222", "+86132**2222" is determined as the card information of the second SIM card, a device in which the second SIM card is located is the third device, and login authentication of the application may be performed based on the card information.

In some implementations, when detecting a specific operation like startup of the application, the first device 410 may perform at least some operations in S801, to determine the first SIM card, the second SIM card, and the third SIM card, obtain authorization of the user for the first SIM card, the second SIM card, and the third SIM card, and determine priorities of performing login authentication by using the first SIM card, the second SIM card, and the third SIM card. In some other implementations, the first device 410 may alternatively determine the first SIM card, the second SIM card, and the third SIM card in advance, obtain authorization of the user for the first SIM card, the second SIM card, and the third SIM card, and determine priorities of performing login authentication by using the first SIM card, the second SIM card, and the third SIM card. Therefore, S801 may be omitted. For example, if the user determines the first SIM card, the second SIM card, and the third SIM card in advance, authorizes the first SIM card, the second SIM card, and the third SIM card, and sets a priority of the first SIM card to be higher than a priority of the second SIM card, and the priority of the second SIM card to be higher than a priority of the third SIM card, the first device 410 may not perform S801 when detecting a specific operation like startup of the application. Instead, login authentication of the application is directly performed according to the following steps based on the card information of the first SIM card. If the authentication fails, login authentication of the application is performed based on the card information of the second SIM card. If the authentication fails again, login authentication of the application is performed based on the card information of the third SIM card.

In some implementations, the first device 410 may implement S801 by using an application or an SDK of the network operator, to obtain authorization of the user for the first SIM card.

S802: The first device 410 establishes a far-field network connection with the second device 430.

The first device 410 may establish the far-field network connection with the second device 430 when it is requested to perform login authentication for an application on the first device 410 by using a cellular mobile network.

In some implementations, the first device 410 and the second device 430 may establish the far-field network connection in a P2P traversal manner or a relay manner. Certainly, in practice, the first device 410 and the second device 430 may alternatively establish the far-field network connection in another manner. A manner of establishing the far-field network connection and a type of the far-field network connection are not limited in embodiments of this application.

In some implementations, the first device 410 may implement S802 by using the SDK of the network operator or a telephony service.

It should be noted that the far-field network connection between the first device 410 and the second device 430 may be used for a long time or a plurality of times once established, or the far-field network connection between the first device 410 and the second device 430 may exist frequently or permanently. Therefore, S802 may be omitted.

S803: The first device 410 notifies the second device 430 to enable the cellular mobile network.

Because the cellular mobile network in the second device 430 may not be enabled, to improve reliability of login authentication, the first device 410 may notify the second device 430 to enable the cellular mobile network.

In some implementations, that the first device 410 notifies the second device 430 to enable the cellular mobile network may include: notifying the second device 430 to turn on a switch of the cellular mobile network, or switching the cellular mobile network in a sleep state to an active state.

In some implementations, the first device 410 may notify, through the far-field network connection with the second device 430, the second device 430 to enable the cellular mobile network.

In some implementations, the second device 430 may detect whether the current cellular mobile network is enabled. If yes, the second device 430 may notify the first device 410 that the cellular mobile network is enabled. Otherwise, the second device 430 may first enable the cellular mobile network and then notify the first device 410 that the cellular mobile network is enabled.

In some implementations, the first device 410 may create a virtual network interface card corresponding to the first SIM card. The virtual network interface card may be used as a network proxy. When receiving data by using the virtual network interface card, the first device 410 actually receives the data by using the first SIM card in the second device 430. When sending data by using the virtual network interface card, the first device 410 actually sends the data by using the first SIM card in the second device 430.

In some implementations, the first device 410 may notify the second device 430 to connect to the cellular mobile network by using the first SIM card.

In some implementations, the first device 410 may implement S803 by using the SDK of the network operator or the telephony service.

It should be noted that the second device 430 may enable the cellular mobile network in advance, and does not need to be additionally notified by the first device 410. Therefore, S803 may be omitted.

S804: The first device 410 generates a first authentication request based on the card information of the first SIM card.

The first authentication request may be used for login authentication of the application.

In some implementations, the first authentication request may include one or more of the card information of the first SIM card, related information of the second device 430, and user identity information corresponding to the first SIM card or the second device 430. It may be understood that the first authentication request may alternatively include more or less information for login authentication.

In some implementations, the first device 410 may implement S804 by using the application or the SDK of the network operator.

S805: The first device 410 sends the first authentication request to the second server 440.

In some implementations, the first device 410 may send the first authentication request to the second device 430 through the far-field network connection. The second device 430 is connected to the cellular mobile network by using the first SIM card, and then sends the first authentication request to the second server 440 through the cellular mobile network.

In some implementations, the first device 410 may implement S805 by using the telephony service.

S806: The second server 440 returns a first authentication result to the first device 410.

The second server 440 authenticates based on the first authentication request, to generate the first authentication result. In some implementations, the second server 440 may detect whether the card information of the first SIM card corresponds to the second device 430. If yes, it is determined that the authentication succeeds. Otherwise, it is determined that the authentication fails. In some implementations, the second server 440 may detect whether the card information used in the cellular mobile network that sends the first authentication request is consistent with the card information carried in the first authentication request. If yes, it is determined that the authentication succeeds. Otherwise, it is determined that the authentication fails. Certainly, in practice, the second server 440 may alternatively authenticate based on the first authentication request in another manner. A manner of the authentication is not limited in embodiments of this application.

In some implementations, the second server 440 sends the first authentication result to the second device 430 through the cellular mobile network, and the second device 430 sends the first authentication result to the first device 410 through the far-field network connection.

In some implementations, the first device 410 may prompt the user with a login authentication result, for example, the authentication succeeds or the authentication fails.

In some implementations, the first device 410 may implement S806 by using the telephony service.

S807: The first device 410 notifies the second device 430 to disable the cellular mobile network.

In some implementations, when receiving the first authentication result, or when login authentication ends, the first device 410 may notify, through the far-field network connection with the second device 430, the second device 430 to disable the cellular mobile network, to reduce power consumption of the second device 430.

In some implementations, the first device 410 may implement S807 by using the SDK of the network operator or the telephony service.

It should be noted that the second device 430 may also need to use the cellular mobile network. Therefore, S807 may be omitted.

S808: The first device 410 disables the far-field network connection with the second device 430.

When receiving the first authentication result, or when login authentication ends, the first device 410 may disable the far-field network connection with the second device 430, to reduce power consumption of the first device 410 and the second device 430.

In some implementations, the first device 410 may implement S808 by using the SDK of the network operator or the telephony service.

It should be noted that S808 may be omitted.

In this embodiment of this application, when performing login authentication for the application, the first device 410 may establish the far-field network connection with the second device 430, and notify the second device 430 to enable the cellular mobile network, to communicate with the second server 440 through the cellular mobile network, and complete the login authentication. Therefore, the first device 410 can still complete login authentication for the application without being configured with a SIM card. This improves convenience and reliability of login authentication.

Figure 13:
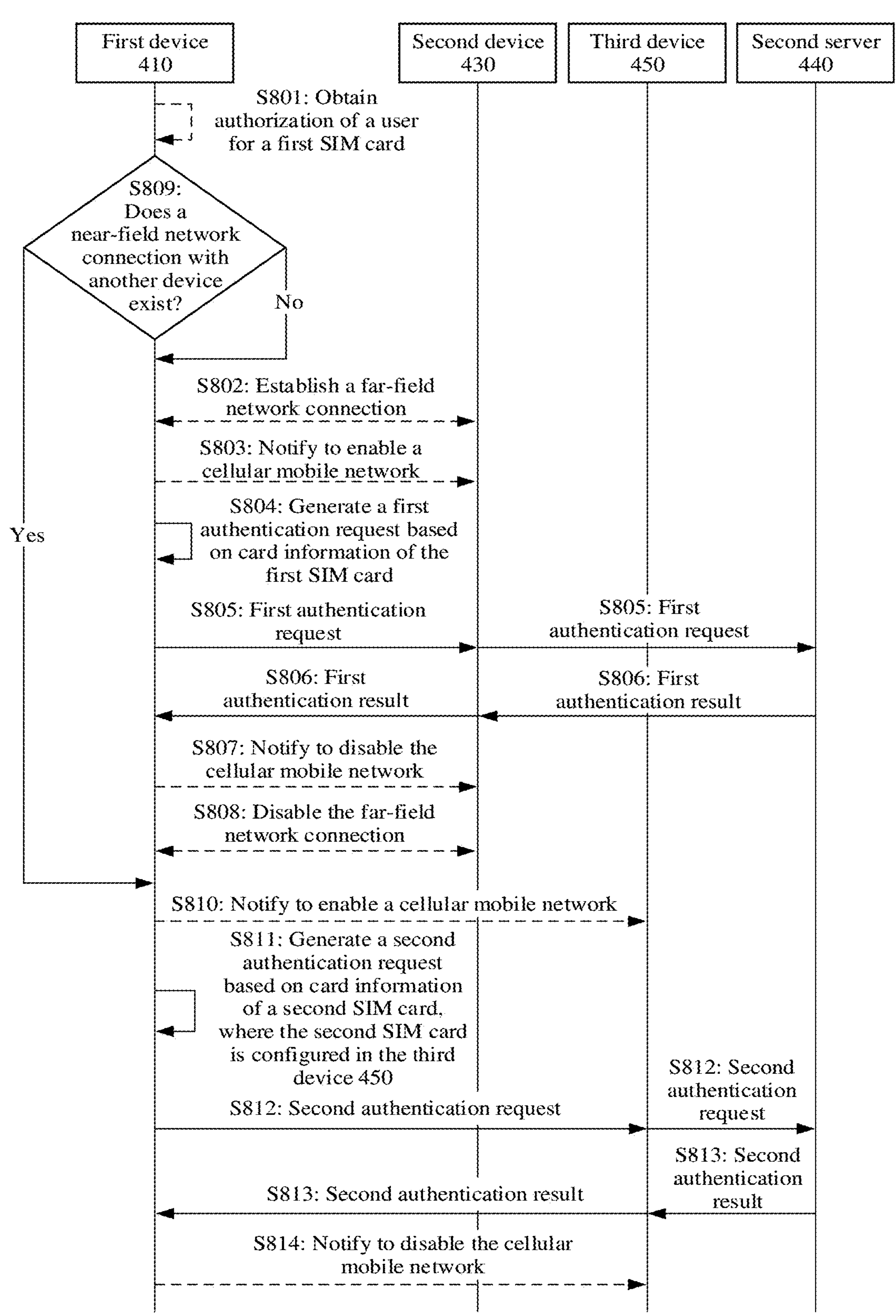
FIG. 13 is a flowchart of another login authentication method according to an embodiment of this application.

FIG. 13 is a flowchart of a login authentication method according to an embodiment of this application. The method may be used as a detailed description of the method described in FIG. 8. Before performing S802 to establish the far-field network connection with the second device 430, the first device 410 may perform S809. It should be noted that the method is not limited to a specific sequence described in FIG. 13 and below. It should be understood that in another embodiment, a sequence of some steps in the method may be exchanged based on an actual requirement, or some steps in the method may be omitted or deleted. The method includes the following steps.

S809: The first device 410 determines whether a near-field network connection with another device exists. If no, perform S802 to S808; otherwise, perform S810 to S814.

S810: The first device 410 notifies a third device 450 to enable a cellular mobile network.

The third device 450 may be any device that has a near-field network connection with the first device 410.

In some implementations, the first device 410 may notify, through the near-field network connection, the third device 450 to enable the cellular mobile network. The third device 450 may enable the cellular mobile network based on the second SIM card, and notify the first device 410 that the cellular mobile network is enabled.

In some implementations, the first device 410 may be connected to the cellular mobile network via the second SIM card by using the third device 450.

It should be noted that, based on a reason similar to that for omitting S803, S810 may also be omitted.

S811: The first device 410 generates a second authentication request based on the card information of the second SIM card, and the third device 450 is configured with the second SIM card.

The second authentication request may be used for login authentication of the application.

It should be noted that a manner in which the first device 410 performs S811 may be the same as or similar to a manner in which the first device 410 performs S804. Details are not described herein again.

S812: The first device 410 sends the second authentication request to the second server 440.

In some implementations, the first device 410 may send the second authentication request to the third device 450 through the near-field network connection. The third device 450 is connected to the cellular mobile network by using the second SIM card, and sends the second authentication request to the second server 440 through the cellular mobile network.

S813: The second server 440 sends a second authentication result to the first device 410.

In some implementations, the second server 440 sends the second authentication result to the third device 450 through the cellular mobile network, and the third device 450 sends the second authentication result to the first device 410 through the near-field network connection.

In some implementations, the second server 440 in S812 and S813 may be replaced with a third server, and a network operator of the third server may be different from a network operator of the second server 440. That is, when a cellular mobile network is connected by using different SIM cards and login authentication is performed based on card information of different SIM cards, servers that provide a login authentication service may also be different.

S814: The first device 410 notifies the third device 450 to disable the cellular mobile network.

It should be noted that, based on a reason similar to that for omitting S807, S814 may also be omitted.

In some implementations, the first device 410 may alternatively disable the near-field network connection with the third device 450, to reduce power consumption of the first device 410 and the third device 450.

It should be noted that implementations of S810 to S814 may also be the same as or similar to implementations of S803 to S807.

In this embodiment of this application, when performing login authentication for the application, the first device 410 may determine whether a near-field network connection between the first device 410 and the another device exists. If the near-field network connection does not exist, the first device 410 may establish the far-field network connection between the first device 410 and the second device 430, to access a cellular mobile network by using the first SIM card of the second device 430, and communicate with the second server 440 through the cellular mobile network, to complete the login authentication. However, if the near-field network connection exists, the first device 410 may access a cellular mobile network by using the second SIM card of the third device 450, and communicate with the second server 440 through the cellular mobile network, to complete the login authentication without establishing the far-field network connection. This improves the efficiency of login authentication.

In some implementations, when performing login authentication for the application, the first device 410 may alternatively establish both the near-field network connection between the first device 410 and the third device 450 and the far-field network connection between the first device 410 and the second device 430. When a moment at which the far-field network connection is successfully established is earlier than a moment at which the near-field network connection is successfully established, the first device 410 accesses the cellular mobile network by using the first SIM card of the second device 430, and sends the first authentication request to the second server through the cellular mobile network, to perform login authentication for the application based on the card information of the first SIM card; or when a moment at which the near-field network connection is successfully established is earlier than a moment at which the far-field network connection is successfully established, the first device 410 accesses the cellular mobile network by using the second SIM card of the third device 450, and sends the second authentication request to the second server through the cellular mobile network, to perform login authentication for the application based on the card information of the second SIM card. This further improves the efficiency of login authentication.

Based on a same inventive concept, an embodiment of this application further provides an electronic device. The electronic device provided in this embodiment includes a memory and a processor. The memory is configured to store a computer program. The processor is configured to perform, when invoking the computer program, the methods in the foregoing method embodiments.

The electronic device provided in this embodiment may perform the operations performed by the first device, the second device, the first server, or the second server in the foregoing method embodiments. Implementation principles and technical effects of the electronic device are similar to those of the first device, the second device, the first server, or the second server. Details are not described herein again.

Based on a same inventive concept, an embodiment of this application further provides a chip system. The chip system includes a processor, the processor is coupled to a memory, and the processor executes a computer program stored in the memory, to implement the operations performed by the first device, the second device, the first server, or the second server in the foregoing method embodiments.

The chip system may be a single chip or a chip module including a plurality of chips.

An embodiment of this application further provides a computer-readable storage medium. The computer-readable storage medium stores a computer program. When the computer program is executed by a processor, the operations performed by the first device, the second device, the first server, or the second server in the foregoing method embodiments are implemented.

An embodiment of this application further provides a computer program product. When the computer program product is run on an electronic device, the electronic device is enabled to perform the operations performed by the first device, the second device, the first server, or the second server in the foregoing method embodiments.

When the foregoing integrated unit is implemented in the form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable storage medium may include at least any entity or apparatus that can carry computer program code to a photographing apparatus/terminal device, a recording medium, a computer memory, a read-only memory (read-only memory, ROM), a random access memory (random access memory, RAM), an electrical carrier signal, a telecommunication signal, and a software distribution medium, for example, a USB flash drive, a removable hard disk, a magnetic disk, or an optical disc.

In the foregoing embodiments, the description of each embodiment has respective focuses. For a part that is not described in detail or recorded in an embodiment, refer to related descriptions in other embodiments.

Persons of ordinary skill in the art may be aware that, the example units and algorithm steps described with reference to embodiments disclosed in this specification can be implemented by electronic hardware or a combination of computer software and electronic hardware. Whether the functions are performed by hardware or software depends on particular applications and design constraints of the technical solutions. Persons skilled in the art may use different methods to implement the described functions for each particular application, but it should not be considered that the implementation goes beyond the scope of this application.

In the several embodiments provided in this application, it should be understood that the disclosed apparatus/device and method may be implemented in other manners. For example, the described apparatus/device embodiments are merely examples. For example, division into the modules or units is merely logical function division, and may be other division in practice. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electronic, mechanical, or other forms.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application indicates any combination and all possible combinations of one or more associated listed items, and includes these combinations.

As used in the specification and the appended claims of this application, the term "if" may be interpreted as "when" or "once" or "in response to determining" or "in response to detecting" depending on the context. Similarly, the phrase "if it is determined that" or "if [a described condition or event] is detected" may be interpreted as a meaning of "once it is determined that" or "in response to determining" or "once [a described condition or event] is detected" or "in response to detecting [a described condition or event]" depending on the context.

In addition, in the descriptions of the specification and the appended claims of this application, the terms "first", "second", "third", and the like are merely intended for differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily refer to a same embodiment. Instead, the statements mean "one or more but not all of embodiments", unless otherwise specifically emphasized in another manner. The terms "include", "comprise", and "have", and variants thereof all mean "include but are not limited to", unless otherwise specifically emphasized in another manner.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of this application.

The invention claimed is:

1. A method, comprising:

obtaining, by a first device, device information of a first device set from a first server, wherein each device in the first device set is associated with the first device, the first device set comprises a second device, and the second device is configured with a first subscriber identity module (SIM) card;

performing, by the first device, login authentication for an application based on card information of the first SIM card, wherein performing, by the first device, the login authentication for the application based on the card information of the first SIM card comprises:

establishing, by the first device, a far-field network connection with the second device; and sending, by the first device, a first authentication request to the second device through the far-field network connection between the first device and the second device, wherein the first authentication request is generated by the first device based on the card information of the first SIM card, and the login authentication for the application is performed with the first authentication request; and breaking, by the first device, the far-field network connection when the login authentication ends.

2. The method according to claim 1, wherein obtaining, by the first device, the device information of the first device set from the first server comprises:

sending, by the first device, a first obtaining request to the first server; and receiving, by the first device, the first device set returned by the first server in response to the first obtaining request.

3. The method according to claim 1, wherein the device information of the first device set comprises configuration information of each device in the first device set, and the configuration information of each device in the first device set indicates whether a respective device is configured with a SIM card.

4. The method according to claim 1, wherein each device in the first device set is configured with a SIM card.

5. The method according to claim 1, wherein the method further comprises:

displaying, by the first device, a first card set, wherein the first card set comprises at least one SIM card, and each SIM card in the first card set is configured in a device in the first device set; and determining, by the first device, the first SIM card from the first card set.

6. The method according to claim 1, wherein:

the first device set comprises a second device set or a third device set;

the second device set comprises at least one device, and each device in the second device set is logged in to a same account as the first device; and the third device set comprises at least one device, and each device in the third device set is associated with a logged-in account of the first device.

7. The method according to claim 6, wherein the first device set comprises the second device set and the third device set, and the method further comprises:

displaying, by the first device, a second card set, wherein the second card set comprises at least one SIM card, and each SIM card in the second card set is configured in a device in the second device set;

when the first device determines that the second card set does not comprise the first SIM card, displaying, by the first device, a third card set, wherein the third card set comprises at least one SIM card, and each SIM card in the third card set is configured in a device in the third device set; and determining, by the first device, the first SIM card from the third card set.

8. The method according to claim 1, wherein performing, by the first device, login authentication for the application based on the card information of the first SIM card further comprises:

receiving, by the first device through the far-field network connection, a first authentication result returned by the second device.

9. The method according to claim 8, wherein establishing, by the first device, the far-field network connection with the second device comprises establishing, by the first device, the far-field network connection with the second device when there is no near-field network connection between the first device and another device.

10. The method according to claim 8, wherein the method further comprises:

when the first device performs the login authentication for the application, when there is no near-field network connection between the first device and another device, establishing the near-field network connection with a third device; and wherein sending, by the first device, the first authentication request to the second device through the far-field network connection comprises:

when the far-field network connection is successfully established earlier than the near-field network connection is successfully established, sending, by the first device, the first authentication request to the second device through the far-field network connection.

11. The method according to claim 8, wherein the method further comprises:

notifying, by the first device through the far-field network connection, the second device to enable a cellular mobile network; and notifying, by the first device through the far-field network connection, the second device to disable a cellular mobile network.

12. The method according to claim 1, wherein the card information of the first SIM card in the first device is from the second device or the first server.

13. A method, comprising:

sending, by a first server, device information of a first device set to a first device, wherein each device in the first device set is associated with the first device, the first device set comprises a second device, the second device is configured with a first subscriber identity module (SIM) card, and the first device is configured to;

perform login authentication for an application based on the first SIM card, wherein performing the login authentication for the application based on the first SIM card comprises:

establishing a far-field network connection with the second device; and sending a first authentication request to the second device through the far-field network connection between the first device and the second device, wherein the first authentication request is generated by the first device based on the first SIM card, and the login authentication for the application is performed with the first authentication request; and break the far-field network connection when the login authentication ends.

14. The method according to claim 13, further comprising:

receiving, by the first server, a first obtaining request sent by the first device, wherein sending, by the first server, the device information of the first device set to the first device comprises:

sending, by the first server, the device information of the first device set to the first device in response to the first obtaining request of the first device.

15. The method according to claim 13, wherein the device information of the first device set comprises card information of the first SIM card.

16. The method according to claim 13, wherein the method further comprises:

obtaining, by the first server, device information of the second device from the second device.

17. The method according to claim 13, wherein the device information of the first device set comprises configuration information of each device in the first device set, and the configuration information of each device indicates whether a respective device is configured with a SIM card.

18. An electronic device, comprising:

at least one memory; and at least one processor, wherein the at least one memory is configured to store a computer program, and when the at least one processor invokes the computer program, the electronic device is caused to perform a method comprising:

obtaining device information of a first device set from a first server, wherein each device in the first device set is associated with the first device, the first device set comprises a second device, and the second device is configured with a first subscriber identity module (SIM) card;

performing login authentication for an application based on card information of the first SIM card, wherein performing, by the first device, the login authentication for the application based on the card information of the first SIM card comprises:

establishing, by the first device, a far-field network connection with the second device; and sending, by the first device, a first authentication request to the second device through the far-field network connection between the first device and the second device, wherein the first authentication request is generated by the first device based on the card information of the first SIM card, and the login authentication for the application is performed with the first authentication request; and breaking, by the first device, the far-field network connection when the login authentication ends.

19. The electronic device according to claim 18, wherein the first device set comprises a second device set and a third device set, and each device in the second device set is logged in to a same account as the electronic device, each device in the third device set is associated with a logged-in account of the electronic device, and the method further comprises:

displaying, by the first device, a second card set, wherein the second card set comprises at least one SIM card, and each SIM card in the second card set is configured in a device in the second device set;

when the first device determines that the second card set does not comprise the first SIM card, displaying, by the first device, a third card set, wherein the third card set comprises at least one SIM card, and each SIM card in the third card set is configured in a device in the third device set; and determining, by the first device, the first SIM card from the third card set.

20. The electronic device according to claim 18, wherein performing login authentication for the application based on the card information of the first SIM card further comprises:

receiving, through the far-field network connection, a first authentication result returned by the second device.

* * * * *